United States Patent [19]

Bartow et al.

[11] Patent Number: 5,481,738
[45] Date of Patent: Jan. 2, 1996

[54] APPARATUS AND METHOD FOR COMMUNICATING A QUIESCE AND UNQUIESCE STATE BETWEEN ELEMENTS OF A DATA PROCESSING COMPLEX

[75] Inventors: Neil G. Bartow, Saugerties; Steven N. Goss, Lake Katrine; Douglas W. Westcott, Rhinebeck, all of N.Y.

[73] Assignee: International Business Machines Corporation, Armonk, N.Y.

[21] Appl. No.: 71,154

[22] Filed: Jun. 1, 1993

Related U.S. Application Data

[63] Continuation-in-part of Ser. No. 839,657, Feb. 20, 1992, Pat. No. 5,357,608, Ser. No. 839,986, Feb. 20, 1992, Pat. No. 5,267,240, and Ser. No. 839,652, Feb. 20, 1992, Pat. No. 5,412,803.

[51] Int. Cl.$^6$ .............................. G06F 13/00; H04J 3/02
[52] U.S. Cl. ........................ 395/800; 370/85.1; 370/32; 340/825.09; 364/284; 364/284.3; 364/260
[58] Field of Search ..................................... 395/200, 550, 395/800; 370/85.1, 32; 340/825.09

[56] References Cited

U.S. PATENT DOCUMENTS

| | | | |
|---|---|---|---|
| 3,787,891 | 1/1974 | Moore et al. | 395/200 |
| 4,386,400 | 5/1983 | Cope et al. | 395/275 |
| 4,542,380 | 9/1985 | Beckner et al. | 340/825.5 |
| 4,734,780 | 3/1988 | Iwata et al. | 358/435 |
| 4,736,366 | 4/1988 | Rickard | 370/85.1 |
| 4,750,109 | 6/1988 | Kita | 395/200 |
| 4,970,640 | 11/1990 | Beardsley et al. | 395/725 |
| 4,974,147 | 11/1990 | Hanrahan et al. | 395/275 |
| 5,103,446 | 4/1992 | Fischer | 370/85.1 |
| 5,339,405 | 8/1994 | Elko et al. | 395/575 |
| 5,359,594 | 10/1994 | Gould et al. | 370/24 |

FOREIGN PATENT DOCUMENTS 260346 11/1986 Japan.

OTHER PUBLICATIONS

IBM Technical Disclosure Bulletin, vol. 24, No. 8 Jan. 1982 pp. 4433–4434, "Quiesce and Idle of a System" by Annunziata, et al.

*Primary Examiner*—Krisna Lim
*Attorney, Agent, or Firm*—Lynn L. Augspurger; Laurence J. Marhoefer

[57] ABSTRACT

A system for the transmission of information between elements of a data processing complex and a method for establishing such a system. Two elements of a data processing system are connected by a physical link comprising multiple conductors attached to transceivers at channels in each data processing element. Once the transceivers have been synchronized, commands and responses are exchanged which ensure that all of the transceivers in a channel are connected to the same channel on the other end of the conductor. If the transceivers are considered configured and an entry is made in a Configured-Transceiver table. A search is made of an Allowed-Operational-Link table which contains sets of transceivers which are allowed to become operational links. The set of transceivers thus found, is compared against the Configured-Transceiver-Table to verify that all of the members of the set have been configured. If a match is found, this set of transceivers becomes an Intended-Operational-Link. The Intended-Operational-Link is verified to ensure that both channels agree on the set of conductors will form the operational link. If the Intended-Operational-Link verifies, the operational link is established therefrom. The link can be reconfigured by utilizing a quiesce function.

12 Claims, 11 Drawing Sheets

```
       QUIESCE ORIGINATOR                QUIESCE RECIPIENT

<─────── MESSAGE REQUEST   1101
  1100  QUIESCE REQUEST   ───────>
  1102  MESSAGE REQUEST   ───────>
                                    <─────── MESSAGE RESPONSE  1103

1104  MESSAGE RESPONSE  ───────>
  1106  MESSAGE REQUEST   ───────>
                                    <─────── QUIESCE RESPONSE  1105
                                    <─────── MESSAGE RESPONSE  1107

1108  QUIESCED
```

FIG. 5

CONFIGURED-TRANSCEIVER SUBTABLE

| CONDUCTOR | STATE |
|---|---|
| 1 | CONFIGURED/NOT CONFIGURED |
| 2 | CONFIGURED/NOT CONFIGURED |
| 3 | CONFIGURED/NOT CONFIGURED |
| 4 | CONFIGURED/NOT CONFIGURED |

FIG. 7

ALLOWED-OPERATIONAL-LINK SUBTABLE

| SEARCH ORDER | CONDUCTORS |
|---|---|
| 1 | 1-2-3-4 |
| 2 | 1-2 |
| 3 | 3-4 |
| 4 | 1 |
| 5 | 2 |
| 6 | 3 |
| 7 | 4 |

FIG. 6

- ALL OF THE TRANSCEIVERS
- THE HIGH ORDER ONE HALF OF THE TRANSCEIVERS
- THE LOW ORDER ONE HALF OF THE TRANSCEIVERS
- THE FIRST QUARTER OF THE TRANSCEIVERS
- THE SECOND QUARTER OF THE TRANSCEIVERS
- THE THIRD QUARTER OF THE TRANSCEIVERS
- THE FOURTH QUARTER OF THE TRANSCEIVERS
- THE FIRST EIGHTH OF THE TRANSCEIVERS
- THE SECOND EIGHTH OF THE TRANSCEIVERS
- THE THIRD EIGHTH OF THE TRANSCEIVERS
- THE FOURTH EIGHTH OF THE TRANSCEIVERS
- THE FIFTH EIGHTH OF THE TRANSCEIVERS
- THE SIXTH EIGHTH OF THE TRANSCEIVERS
- THE SEVENTH EIGHTH OF THE TRANSCEIVERS
- THE EIGHTH EIGHTH OF THE TRANSCEIVERS
- THE FIRST SIXTEENTH OF THE TRANSCEIVERS
- THE SECOND SIXTEENTH OF THE TRANSCEIVERS

.
  .
  .

- THE FIFTEENTH SIXTEENTH OF THE TRANSCEIVERS
- THE SIXTEENTH SIXTEENTH OF THE TRANSCEIVERS
- THE FIRST THIRTY-SECOND OF THE TRANSCEIVERS
- THE SECOND THIRTY-SECOND OF THE TRANSCEIVERS

.
  .
  .

- THE THIRTY FIRST THIRTY-SECOND OF THE TRANSCEIVERS
- THE THIRTY SECOND THIRTY-SECOND OF THE TRANSCEIVERS
- THE FIRST SIXTY-FOURTH OF THE TRANSCEIVERS
- THE SECOND SIXTY-FOURTH OF THE TRANSCEIVERS

.
  .
  .

- THE SIXTY THIRD SIXTY-FOURTH OF THE TRANSCEIVERS
- THE SIXTY FOURTH SIXTY-FOURTH OF THE TRANSCEIVERS

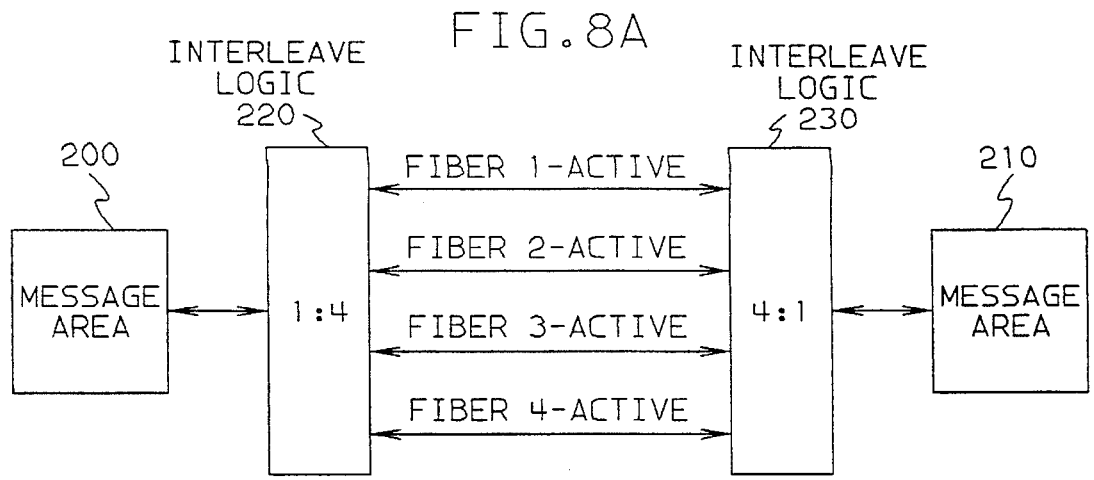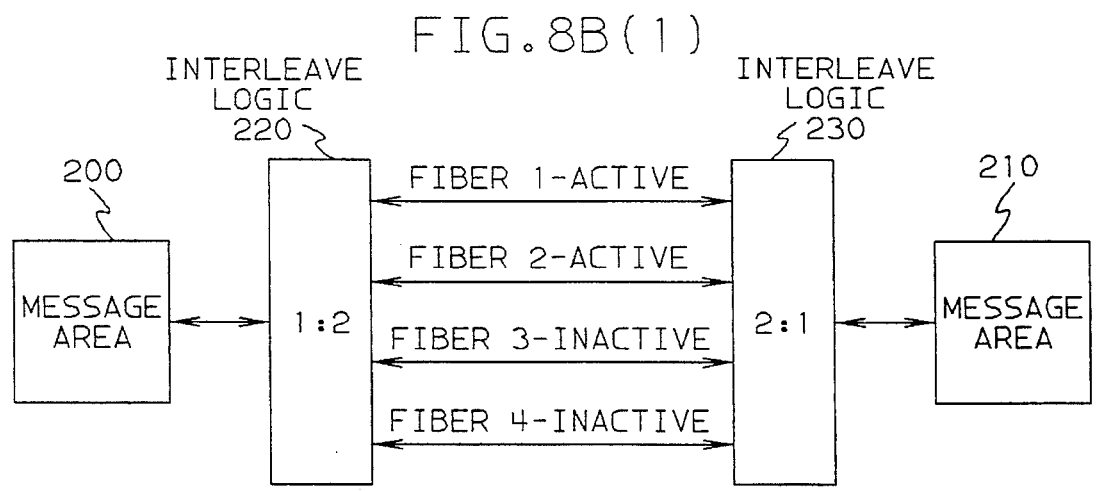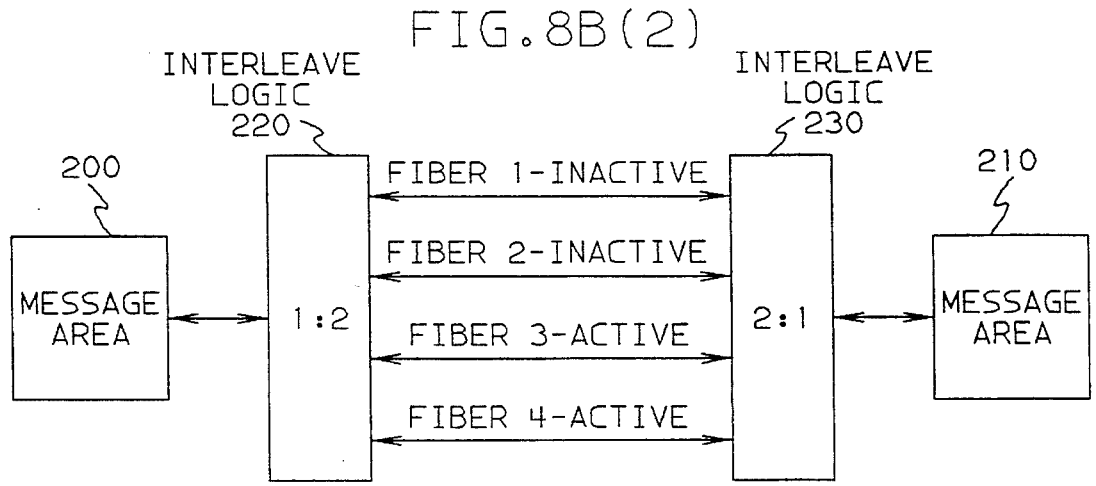

FIG. 8C(1)
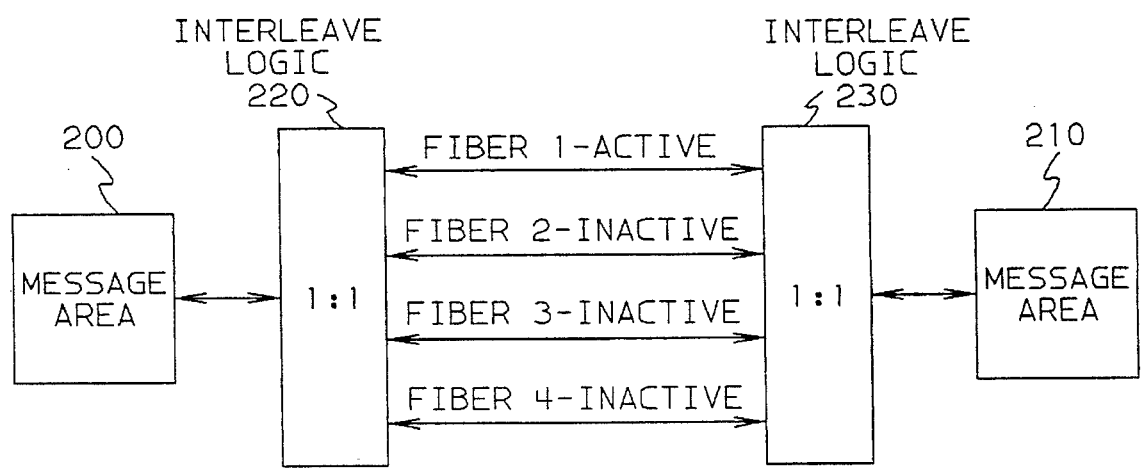
FIG. 8C(2)
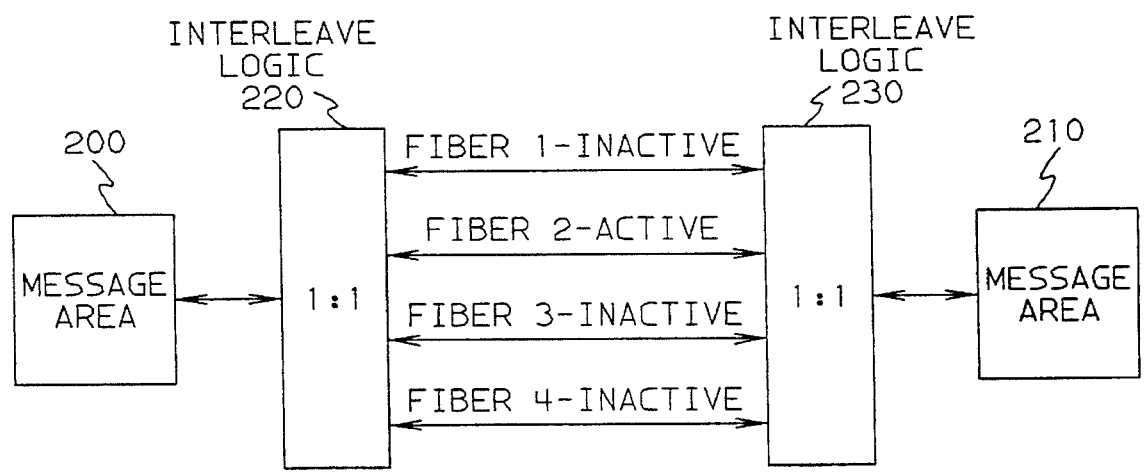

FIG. 8C(3)
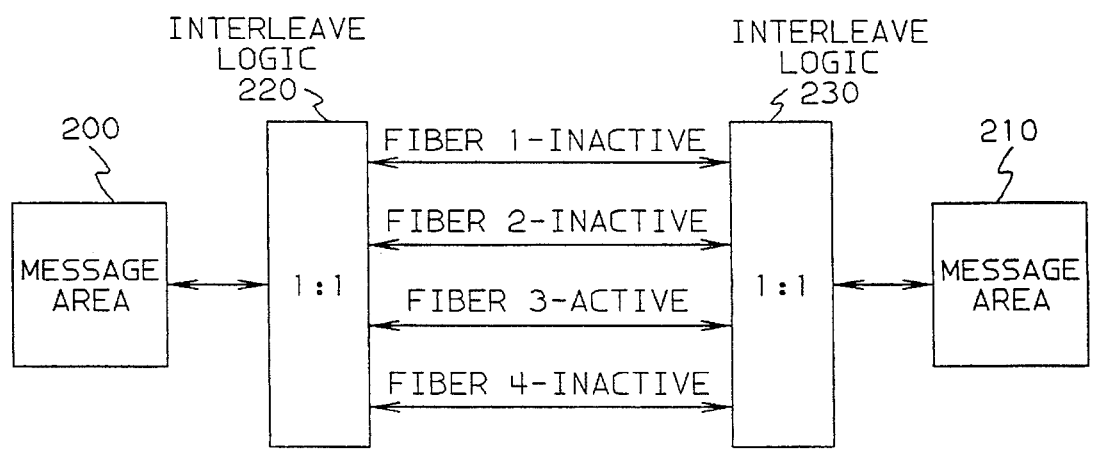
FIG. 8C(4)
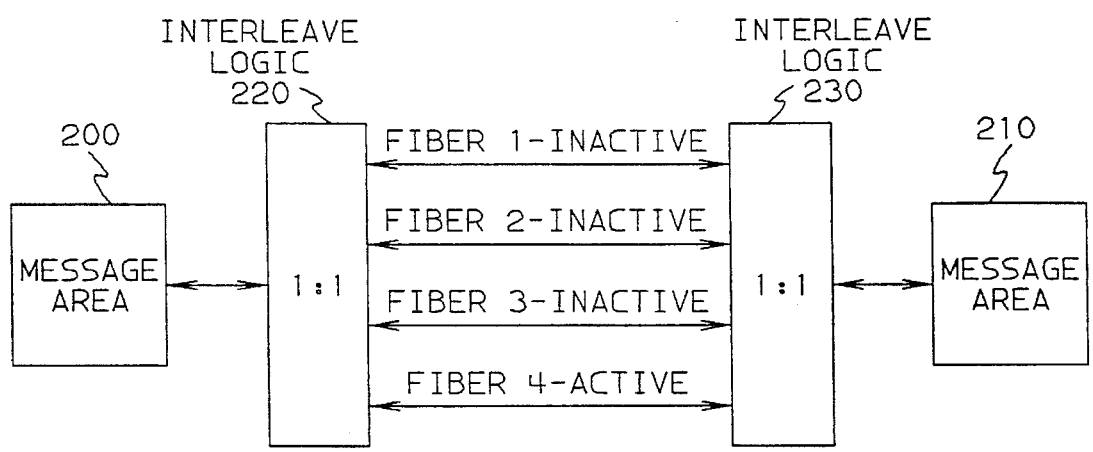

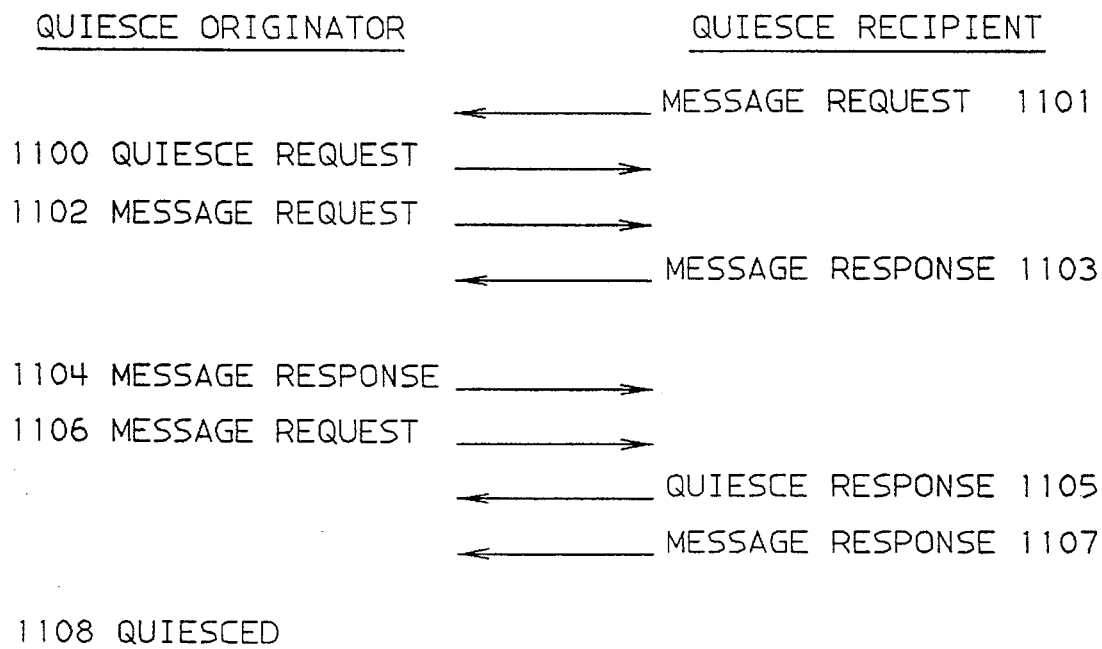
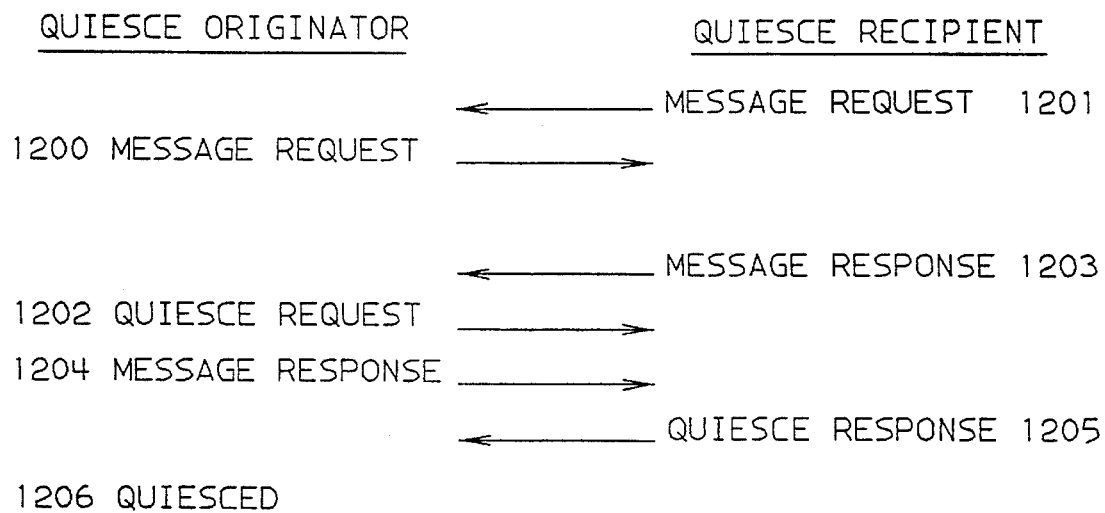

APPARATUS AND METHOD FOR COMMUNICATING A QUIESCE AND UNQUIESCE STATE BETWEEN ELEMENTS OF A DATA PROCESSING COMPLEX

This application is a continuation-in-part of U.S. patent application Ser. No. 07/839,657, filed Feb. 20, 1992 of Neil G. Bartow et al entitled "Configurable, Recoverable Parallel Bus" now U.S. Pat. No. 5,357,608, issued Oct. 18, 1994.

This application is also related to and is a continuation-in-part of U.S. patent application Ser. No. 07/839,986 filed Feb. 20, 1992 entitled "Frame Group Transmission and Reception for Parallel/Serial Buses" now U.S. Pat. No. 5,267,240, issued Nov. 30, 1993.

This application is also related to and is a continuation-in-part of U.S. patent application Ser. No. 07/839,652 filed Feb. 20, 1992 entitled "High Performance Channels for Data Processing Systems", now U.S. Pat. No. 5,412,803, issued May 2, 1995.

FIELD OF THE INVENTION

This invention generally relates to the field of data processing, more specifically to an apparatus and method of communication between elements of a data processing complex having a quiesce and unquiesce function for intersystem channels.

CROSS REFERENCE TO RELATED APPLICATIONS

This application is related to the following applications filed concurrently herewith:

The continuation-in-part of U.S. patent application Ser. No. 07/839,657, filed Feb. 20, 1992 of Neil G. Bartow et al entitled "Configurable, Recoverable Parallel Bus", now U.S. Ser. No. 08/071,146, filed Jun. 1, 1993;

The continuation-in-part of U.S. patent application Ser. No. 07/839,986 filed Feb. 20, 1992 entitled "Frame Group Transmission and Reception for Parallel/Serial Buses", now U.S. Ser. No. 08/071,115, filed Jun. 1, 1993;

U.S. Ser. No. 08/070,587, filed Jun. 1, 1993, by Kenneth J. Fredericks et al entitled "Concurrent Maintenance of Degraded Parallel/Serial Buses", now U.S. Pat. No. 5,418,939, issued May 23, 1995;

U.S. Ser. No. 08/071,150, filed Jun. 1, 1993, by Daniel F. Casper et al entitled "Null Words for Pacing Serial Links to Driver and Receiver Speeds";

U.S. Ser. No. 08/070,589, filed Jun. 1, 1993, by Thomas A. Gregg et al entitled "Error Detection and Recovery in Parallel/Serial Buses".

These co-pending applications and the present application are owned by one and the same assignee, International Business Machines Corporation of Armonk, N.Y.

The descriptions set forth in these co-pending applications are hereby incorporated into the present application by this reference.

BACKGROUND OF THE INVENTION

Fiber optic waveguides enable the serial transmission of information from a driver to a receiver at a relatively long distance (kilometers) and at very high data rates (billions of bits per second). High performance data processing complexes require system buses among its elements to have very high bandwidths of information transfer (hundreds of millions of bytes per second). The use of a single conductor, such as a fiber optic waveguide, can be insufficient to serve as such a system bus because of bandwidth limitations.

In the prior art, one solution to the bandwidth problem has been to use multiple conductors in parallel, each conductor carrying a bit of each word to be transmitted. A second solution, known as data striping, entails sending a plurality of data words in parallel over multiple conductors in a serial fashion. Each word is transmitted serially over a single conductor, but it is transmitted in parallel with other words on other conductors.

One challenge in implementing a data striping technique for information transmission is the determination of which of the multiple conductors attached to a computer element form the system bus linking one computer element to another. Some prior art systems attempt to use each of the conductors which is physically attached to the computer element. This method has a significant drawback in that if one of the conductors is not operational, the entire bus is rendered inoperable. Other prior art systems have attempted to configure a system bus using only the operational conductors, but these prior art systems have been driven by hardware switches and have been further limited to system buses of two conductors.

A second challenge in implementing a data striping technique is adding or deleting one or more of the multiple conductors without injecting errors into the system bus. This may be used for adding a conductor that has been repaired, or removing a conductor for repair purposes. Prior art systems have introduced errors in the system bus when the conductors were added or deleted.

SUMMARY OF THE INVENTION

The present invention is system for the transmission of information between elements of a data processing complex and a method for establishing such a system. Each element of the data processing complex contains at least one channel for enabling communication to other elements of the complex. The channel incorporates the controls, memory and physical connections required for the communication. A physical link, comprising multiple conductors, is the means by which any two channels are connected. In the preferred embodiment, these conductors are one or more pairs of optical fibers. The fiber-pairs are connected to a channel by transceivers. The transceivers enable data to flow in one direction on one of the fibers in the pair, and in the opposite direction on the other fiber. The method of the present invention determines which of the multiple pairs of fibers actually form an operational link between the two data processing elements. An operational link is the set of transceivers and fibers across which the information that comprises a high level operation is communicated. Because the physical elements of the link, the transceivers and/or fibers, can break or otherwise become inoperable, the method of the present invention also allows the operational link of multiple fiber pairs to be reconfigured at any time, with fewer than a full complement of fibers. The method of the present invention also provides for an orderly suspension of information flow on the operational link such that the operational link can be reconfigured with fewer or more fibers in the new operational link without introducing errors on the bus or in the information stream that is carried on the bus.

Either channel can start a quiesce procedure. That channel becomes a quiesce master with a master/slave arrangement for reconfiguration, established so that an operational link can be reconfigured, links added or subtracted, or other routines accomplished during a quiesce phase. The first step in a reconfiguration process is to synchronize the transceivers. When the transceivers have been synchronized, or after the expiration of a specific period of time, a command is issued on each transceiver to acquire a node descriptor for the channel attached to the other side of the fiber. The node descriptor will uniquely identify the channel and transceiver position to which the transceiver is connected (e.g. this transceiver is connected to central processing complex 1, channel 3, transceiver position 2). After the transceivers have acquired the node descriptors for the other end of the link, the acquired node descriptors are compared to ensure that all of the fibers are connected to the same data processing element. If the node descriptor comparison is valid, then the transceiver is considered configured and an entry is made in a Configured-Transceiver table. As a result of the synchronization and node descriptor process, an entry exists in the Configured-Transceiver table for each transceiver attached to the channel. The entries in this table will indicate whether or not any particular transceiver is configured. If a transceiver has been configured, it can be said to be operationally connected to it's counterpart transceiver on the other end of the link. In order to establish the operational link, an Allowed-Operational-Link table is searched. This table contains sets (or combinations) of transceivers which are allowed to become operational links (some combinations of transceivers are not allowed). The table is organized so that the search will first result in a set of transceivers incorporating the greatest number of transceivers connecting the two channels (i.e. the link with the greatest bandwidth). The set of transceivers thus found, is compared against the Configured-Transceiver table to verify whether all of the members of the set have been configured. If even one of the transceivers is not configured, the search of the Allowed-Operational-Link table will continue until a set of fully configured, allowable transceivers has been found. Once a match is found, this set of transceivers becomes an Intended-Operational-Link. As an alternative to using a table, the Allowed-Operational-Links can be dynamically generated by a software program in the system. This software program would successively generate a different Allowed-Operational-Link which would then be tested using the Configured-Transceiver table in order to create the Intended-Operational-Link.

There are three alternative methods by which an Intended-Operational-Link can become the operational link. In a first method, commands are issued from both ends of the link in a peer to peer relationship. In the second method and third method, only one end of the link issues commands, in a master/slave relationship. With respect to the first method, once the Intended-Operational-Link has been determined, each channel issues a command on each transceiver in its Intended-Operational-Link. The channel on the other side of the link which receives this command will compare the received Intended-Operational-Link to its own Intended-Operational-Link in order to verify that there is correspondence. If there is one-to one correspondence, then the recipient channel will send back a response, on each of the transceivers in the Intended-Operational-Link. This response will indicate that the Intended-Operational-Link is acceptable as an operational link. Both ends of the link issues the command on each transceiver in its Intended-Operation-Link, and the responses must be received on the same set of transceivers which sent the command.

The second method for establishing an operational link from an Intended-Operational-Link involves commanding from only one side of the link. With the Intended-Operational-Link determined, one channel, a master, issues a command on each transceiver in its Intended-Operational-Link. The channel which receives this command, a slave, will examine the set of transceivers which received the command to see if they comprise an acceptable operational link. If this set of transceivers comprise a fully configured, allowed operational link as defined by the Configured-Transceiver-Table and the Allowed-Operational-Link-Table, then the channel which is acting as a slave will send back an appropriate response on each of the transceivers in the acceptable Intended-Operational-Link. The master channel which issued the command examines the responses to ensure that responses were received on all of the transceivers in its Intended-Operational-Link (and no additional transceivers). If there is one-to-one correspondence for the responses, then the Intended-Operational-Link becomes the actual operational link, and link operations can start.

The third method for establishing an operational link for an Intended-Operational-Link involves commanding from only one side of the link. One channel, a master, issues an establish-link command on each transceiver in the transceiver configured state. The frames containing the command have a field which indicates the capability of the transceiver to become a member of the intended-operational-link at the sender of the frame. The channel which receives this command, a slave, will examine the frames and determine the set of transceivers which can become an operational-link. A logical AND operation is performed on a transceiver basis for the state of the transceiver at the channel as determined by the transceiver-configured table entry and the capability of the transceiver to become a member of an intended-operational-link as indicated in the frame received by the slave on the respective transceiver. The result of this logical operation is performed for each of the transceivers and the results are used as the candidate transceivers in a search of the allowed-operational-link table and a response is sent from the slave to the master indicating the results on each transceiver in the transceiver-configured state. The response frames returned contain a bit that is unique on each transceiver frame that indicates that the transceiver is part of the intended-operational-link at the slave. Once the slave sends these response frames, the intended-operational link becomes the operational link at the slave. Once the master receives these responses, the intended-operational-link as defined by the received frames is checked against the allowed-operational-link table entries to ensure that the intended-operational-link is valid, and if it is valid, the intended-operational-link becomes the operational-link and use of the link can begin. The master must receive responses on all transceivers in the transceiver configured state before the intended-operational-link can be checked. If responses are not received within a specified time limit, the requests are resent. The allowed-operational-link tables must be the same at both ends of the link for this method to function properly.

There are two methods for bringing an orderly suspension of information flow on the operational link. An orderly suspension of information flow removes the chance of an error being injected into the information stream and is required whenever possible. The repair of a conductor and the requirement to return the conductor back into service is one such requirement. The planned removal of a conductor from service is another such requirement.

The first method uses a quiesce request command that is originated by either end of the link when such an orderly suspension is required by that end of the link. The quiesce request is sent by the originator to the other end of the link called the recipient. When the recipient receives the quiesce request, it allows all messages in progress to continue, but prevents new messages from being started at the recipient end. When all messages that started at the recipient end have completed, including any recovery actions for the messages in progress, a quiesce response is sent to the quiesce originator. The quiesce originator when it sends the quiesce request, or alternatively after it has received the quiesce response, allows all messages in progress to continue, but prevents new messages from being started at the originator end. When all messages that started at the originator end have completed, including any recovery actions for the messages in progress, the quiesce is complete, and the operational link and recovery processes described above can take place without introducing errors into the information stream. There are no errors introduced in the information stream due to the fact that no information is flowing on the operational link once the quiesce is complete. At the end of the operational link initialization and recovery processes, the quiesce is canceled and information flow can occur on the operational link. In the event that both ends of the link request a quiesce at the same time, the end of the link with the higher node descriptor retains the quiesce initiative and the end of the link with the lower node descriptor loses the quiesce initiative.

The second method uses a quiesce request command that is originated by either end of the link when such an orderly suspension is required by that end of the link and all messages originated by that end of the link have completed, including any recovery actions for the messages in progress. The quiesce request is sent by the originator to the other end of the link called the recipient. When the recipient receives the quiesce request, it allows all messages in progress to continue, but prevents new messages from being started at the recipient end. When all messages that started at the recipient end are completed, including any recovery actions for the messages in progress, a quiesce response is sent to the quiesce originator. When the originator receives the quiesce response, the quiesce is complete, and the operational link and recovery processes described above can take place without introducing errors into the information stream. There are no errors introduced in the information stream due to the fact that no information is flowing on the operational link once the quiesce is complete. At the end of the operational link initialization and recovery processes, the quiesce is canceled and information flow can occur on the operational link. In the event that both ends of the link request a quiesce at the same time, the end of the link with the higher node descriptor retains the quiesce initiative and the end of the link with the lower node descriptor loses the quiesce initiative.

For both methods of quiescing the operational link, if the operational link initialization or recovery process is not invoked and the link must become operational again, the quiesce originator sends a unquiesce request to the quiesce recipient and message can start at the recipient. When the quiesce originator receives a quiesce response, or a message, messages can start at the quiesce originator.

BRIEF DESCRIPTION OF THE DRAWINGS

FIG. 5 is a sample Configured-Transceiver table.

FIG. 6 illustrated the organization of the Allowed-Operational-Link table.

FIG. 7 is a sample Allowed-Operational-Link table.

FIG. 8a depicts a four fiber-pair link in which all four fiber-pairs are active.

FIGS. 8b(1) and 8b(2) depict a four fiber-pair link in which only two of the fiber pairs are active.

FIGS. 8c(1), 8c(2), 8c(3) and 8c(4) depict a four fiber-pair link in which only one of the four fiber-pairs is active.

FIG. 11 illustrates the first quiesce methodology.

FIG. 12 illustrates the second quiesce methodology.

DESCRIPTION OF THE PREFERRED EMBODIMENT

Figure 1:
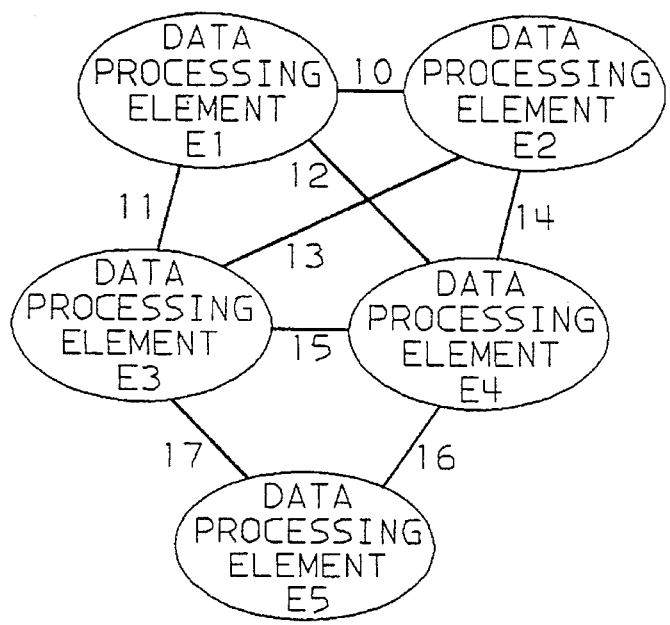
FIG. 1 is a generalized depiction of a data processing complex.
Figure 2:
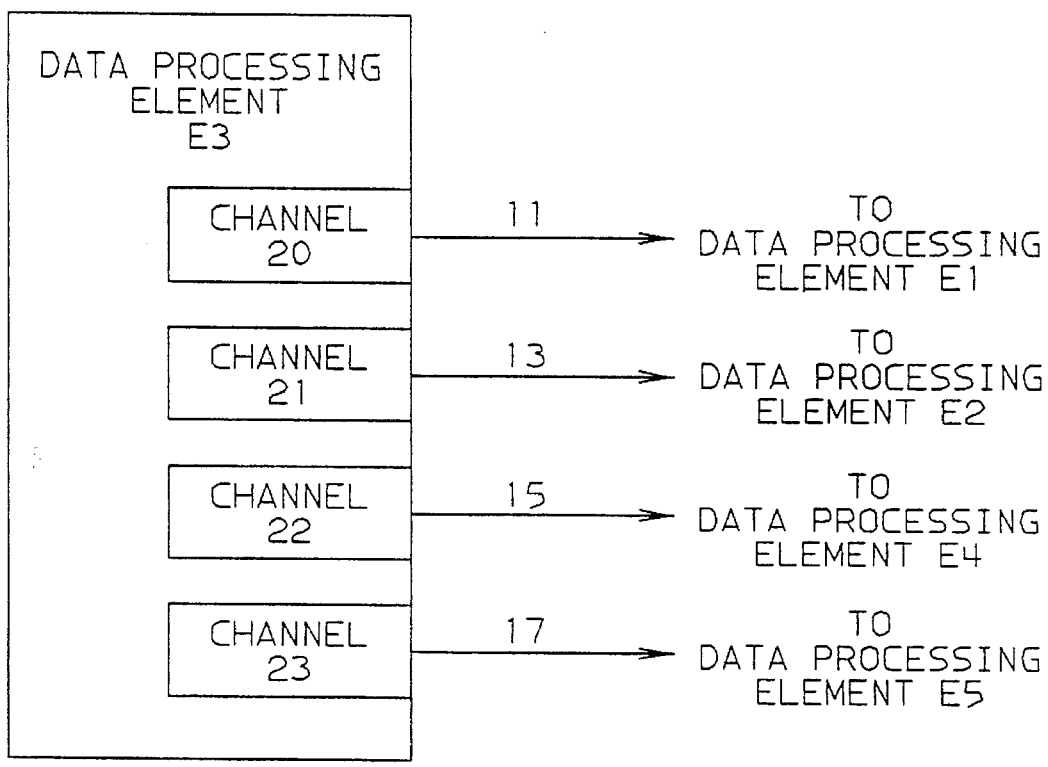
FIG. 2 shows a single generalized data processing element and the connections thereto.

In order for a data processing complex to function effectively, there needs to be an efficient, ideally transparent, system for the elements of the complex to communicate with each other (e.g. central processing complex to central processing complex, central processing complex to shared memory...) The present invention sets forth such a system for the transmission of information. Referring to the generalized data processing complex depicted in FIG. 1, there are physical links, 10–17, which interconnect the elements, E1–E5, of the complex. FIG. 1 is intended to depict a generalized complex of interconnected elements, and not any particular data processing complex. The elements E1–E5 can be, among other things, central processing complexes, I/O devices, Direct Access Storage Devices (DASD), or other electronic elements such as a commonly shared memory system. Each element of the data processing complex does not have to be interconnected with every other element (e.g. a printer does not have to be connected to a DASD). Any given data processing element can be connected to several other elements. The part of each element where interconnections are made to other elements is called a channel. As seen in FIG. 2, data processing element E3 has four different channels, 20–23, by which it is connected to four other elements, E1, E2, E4 and E5 by links 11, 13, 15 and 17 respectively.

Figure 3:
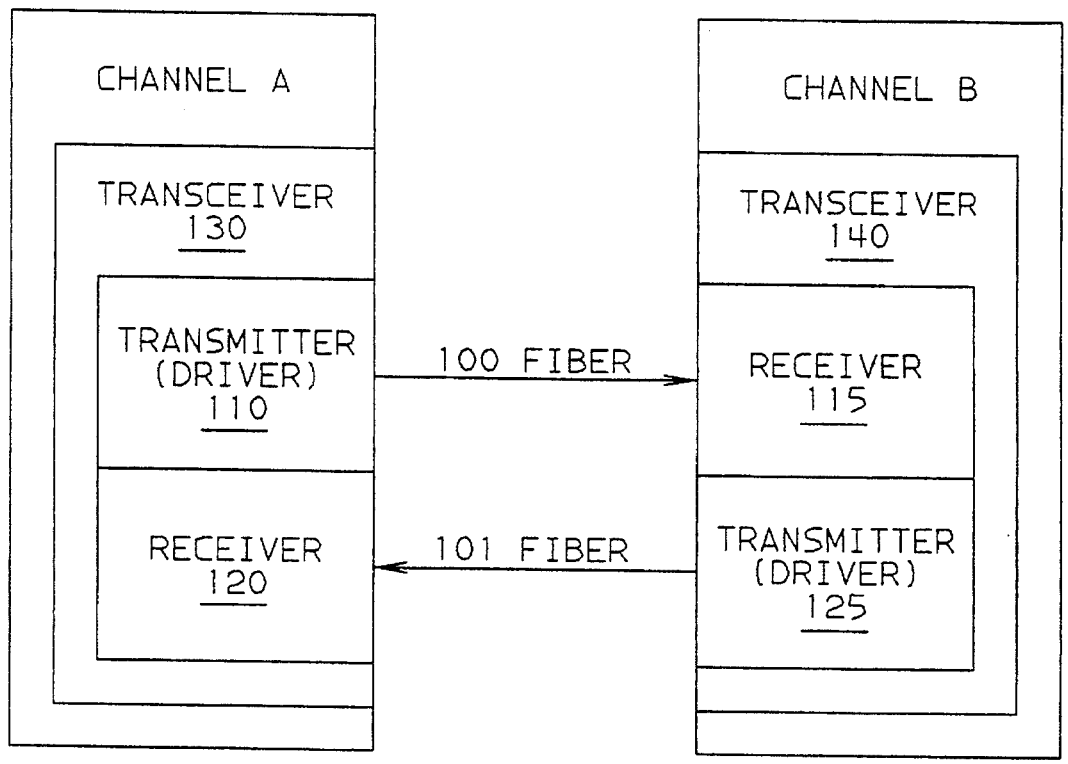
FIG. 3 depicts the connections between two channels of the system.

Each of the physical links attached to a channel can contain a single conductor or be constructed front a number of conductors. In the present invention, the conductors of the link are preferably optical fibers, although the apparatus and method described here are equally applicable to a link constructed of copper conductors, radio waves, infrared, microwave or any other well known transmission medium. The channel will also contain the necessary drivers and receivers which are appropriate for the particular transmission medium which is being employed. The optical fibers of the present invention are typically installed in pairs called fiber-pairs as seen in FIG. 3. In FIG. 3, Channels A and B are shown as being connected by a single conductor, fiber-pair 100 and 101. The designation of A and B for the two channels depicted in this figure is solely for explanatory purposes. Although there are two fibers, 100 and 101, this fiber-pair can be considered a single conductor because both fibers are required for bidirectional communication. Each fiber in the system interconnects a driver at one end and a receiver at the other end of the link. For example, fiber 100 connects transmitter 110 in Channel A with receiver 115 in Channel B (conversely fiber 101 connects driver 125 in Channel B with receiver 120 in Channel A). A driver and receiver are paired in a channel in a device called a transceiver. In FIG. 3, transmitter 110 and receiver 120 in Channel A form one transceiver, 130, while transmitter 125 and receiver 115 constitute a separate transceiver, 140, in Channel B. These interconnected transceivers allow for data to flow in one direction on one fiber (e.g. from Channel A to Channel B on fiber 100) and in the opposite direction on the other fiber (e.g. from Channel B to Channel A on fiber 101).

Figure 4:
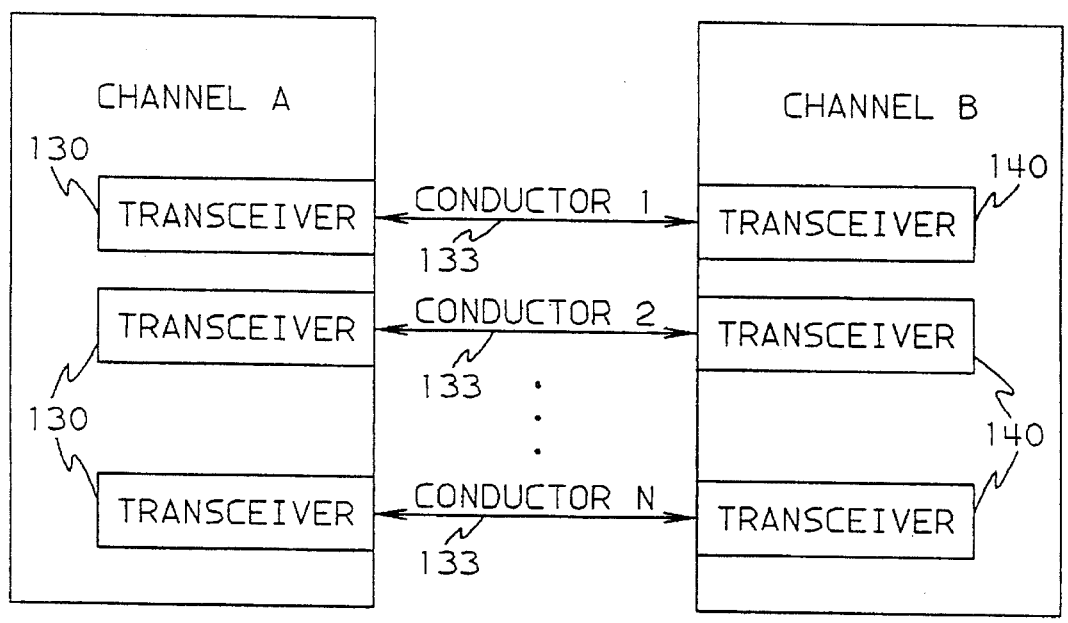
FIG. 4 illustrates a multiconductor link between two channels of the system.

If there is only one set of transceivers interconnecting the channels, as depicted in FIG. 3, the information being transferred between devices would have to be transmitted in a strictly serial fashion. Having a single conductor will limit the bandwidth of information flow which can pass between elements of the data processing complex. The maximum bandwidth in a single conductor system will be governed primarily by the transmission medium chosen. In order to achieve enhanced performance via greater bandwidth, the present invention employs multiple transceivers and associated conductors in a parallel fashion as seen in FIG. 4. In FIG. 4, there are n conductors (labeled conductor 1, conductor 2, . . . conductor N) interconnecting Channels A and B, each of the conductors being a fiber-pair in the preferred embodiment. The n conductors collectively form a link or bus interconnecting the two channels. The information which is to be transferred across the link is broken up into smaller frames of information. Each of the frames is transmitted serially on a single conductor, but in parallel with other frames of information on the other conductors in the link. In this manner, the information can be transmitted serially on a single conductor in a parallel fashion on several conductors. This serial/parallel transmission of data provides a greater bandwidth and thereby enhanced performance of the communication system.

One of the difficulties in establishing a system in which there is parallel transmission of serial data over several conductors, is determining which of the conductors actually constitute the physical link between the connected elements. For example, in one channel of a computer element, there might only be four conductors attached to the channel, while in another channel in the same element there might be sixteen conductors. The system has to be able to identify and utilize the actual number of conductors attached to the specific channel. Furthermore, since it cannot be guaranteed that all of the conductors attached to a channel are operational when the system is initialized, a robust system cannot rely on a full complement of conductors. To be truly adaptable, the system has to be able to reconfigure the bus upon a failure, addition, deletion or repair of a conductor. This reconfiguration will employ a reduced number of conductors and a correspondingly reduced performance, but the loss of a conductor in the parallel bus will not render the entire bus inoperable. The present invention allows for all of the above flexibility while maintaining the greatest bandwidth allowed by the channel implementations at each end of the link.

In the preferred embodiment of the present invention, there are 1, 2, 4, 8, 16, 32 or 64 transceivers in the link connecting any two channels. Each transceiver in the link uses one fiber to carry signals from one computer element to the other computer element and another fiber to carry signals in the opposite direction. It is possible for information to flow on both fibers at the same time. The speed and transmission characteristics of the transceivers may vary from technology to technology. However, all of the transceivers and conductors in a link will have the same general speed and transmission characteristics. For purposes of this discussion, when the term transceiver is used, it is ordinarily meant to imply the transceiver and associated fiber-pair to which it is connected.

In normal operation, the link will attempt to use all of the installed transceivers. At times, however, operation of the link has to proceed using fewer than the full complement of transceivers. For example, to enhance availability, facilitate maintenance, or accommodate the situation where the number of transceivers installed at one computer element differs from the number installed at the other connected element. The transceivers which actually participate in operational information transfer comprise what is called the operational link. The transceivers attached to the channel are assigned to the operational link either during a link-initialization or link-recovery process. Depending on the number of transceivers installed, the number of operational transceivers, the number of configurations supported by the particular channel at each end or the link, and the outcome of the initialization or recovery process, there are 1, 2, 4, 8, 16, 32 or 64 transceivers in the operational link. The normal operation of the link is to use the full complement of attached transceiver pairs. The present invention, though, allows operation of the link with fewer than a full complement of conductors.

At the beginning of the initialization of the link between two elements of the data processing complex, there are multiple conductors 133 which connect the two elements as shown in FIG. 4, but it is unknown which of the conductors are available for operation. If the conductor is unavailable, it cannot form part of the operational link. The first step in the link-initialization procedure is therefore, to establish whether or not there is operational connectivity on each conductor which supposedly connects the two elements. It is an essential determination to initially ascertain which of the conductors are actually, physically capable of carrying a signal from one element of the data processing complex to the other element. In a system employing traditional copper conductors, this connectivity determination might be some type of information exchange test where a series of bits are transmitted across the link and then a response is transmitted back to the originating element to ensure connectivity. In more sophisticated transmission systems such as a radio waves or a fiber optic system, a connectivity test assumes a somewhat more complex nature in the form of a synchronization test. In these more complex systems, the information which is being transmitted is typically being converted from one form of energy to another and back again (e.g. from electrical signals to optical signals and back to electrical signals). Because of the complex nature of these conversions, a communication system must have more complex methods of ensuring connectivity between the terminating elements of the system. In an optical fiber system, connectivity is tested by a procedure known as synchronization. Synchronization involves two transceivers which are connected by the fiber-pairs. During synchronization, a transmitter will attempt to send an encoded signal representing a bit stream to a receiver on the other end of the link. Whenever a signal is present on a transceiver, the receiver attempts to achieve synchronization on both bit transmission and transmission-unit boundaries of the received encoded bit stream. Bit synchronization is where the receiver attempts to identify the start of each bit of the received signal. A bit clock is thus established by this bit synchronization.

The other type of synchronization is known as transmission-unit synchronization. In this type of synchronization, the receiver must be able to identify the beginning and the end of a unit of data which is being transmitted by the driver on the other end of the link. A transmission-unit being a specified number of bits which forms a more manageable unit of data during inter-element communication. If the receiver is able to recognize the bit or unit boundaries, it is said to have achieved synchronization. In the preferred embodiment of the present invention, the system attempts to achieve unit synchronization on every transceiver attached to the channel. It does this by sending a signal from each of the transmitters in each of the transceivers. Once the receivers on the other side of the link have acquired unit synchronization, they inform their respective transceivers on the other side of the link of this synchronization-acquired state. After a specific period of time subsequent to the first transceiver attached to the channel having achieving synchronization (i.e. a timeout) or subsequent to all transceivers having achieved synchronization, the channel assumes that all the transceivers which are functional have established synchronization and every transceiver has achieved its final transceiver state. The final result of the connectivity, or more specifically synchronization, process is that the system has determined which of the physical conductors in the link are initially capable of becoming part of the final operational link between the two elements of the data processing complex.

The next step in the link initialization procedure is for the channel to invoke the initiative to acquire node descriptors from each of the functional transceivers attached to the channel. It must be noted that once any or all of the transceivers on each side of the link have achieved synchronization, the following steps in the process can be performed in parallel and independently in each of the two channels connected by the link. The system can be designed so that the synchronization and node descriptor process can be performed in a sequential fashion on each transceiver, or alternatively all of the transceivers can be synchronized and acquire node descriptors in parallel. A node descriptor is an identifier which uniquely describes a computer element, and optionally a particular interface of a computer element. Each element in the system will have a unique node descriptor and furthermore each interface of each computer element will have a unique node descriptor. The node descriptors for the interface on the other end of the link are acquired to ensure that every transceiver attached to the channel is also attached to the same location on the other end of the link.

There are two methods of acquiring the node descriptor. In the first method, the node descriptors for the elements on the other end of the link are acquired by sending a command from each transceiver attached to the channel. This command is called an operational transceiver request. An operational transceiver request is sent on each of the transceivers independently. A transceiver which receives the request will respond back with its location's unique node descriptor. This response is called an operational transceiver response. Both sides of the link will originate and respond to operational transceiver requests and responses. There is no timing relationship between the two sides during the operational transceiver request/response process (e.g. channel A on one side of the link can perform this operation in parallel and independently of channel B on the other side of the link). Both operational transceiver requests and operational transceiver responses may be sent and received at the same instant, or they may be sent in a sequential fashion.

In the second method, the node descriptors for the elements on the other end of the link are acquired by receiving a frame from each transceiver attached to the channel. This frame is called an operational transceiver frame. Operational transceiver frames consist of the node descriptor along with a request or response command. Only one end of the link must originate a request and the other end respond to exchange node descriptors. An operational transceiver request can be sent on each of the transceivers independently. A transceiver which receives the request will respond back with an operational transceiver response which contains its unique node descriptor. Both sides of the link can originate and respond to operational transceiver requests and responses, only one command must be received to acquire the node descriptor. There is no timing relationship between the two sides during the operational transceiver request/response process (e.g. channel A on one side of the link can perform this operation in parallel and independently of channel B on the other side of the link). Both operational transceiver requests and operational transceiver responses may be sent and received at the same instant, or they may be sent in a sequential fashion.

After a channel has received the first operational transceiver response or request at one of its transceivers, the channel verifies that the transceiver number in the node descriptor matches the transceiver number of the transceiver which received the response. For example, if transceiver number 5 received the first operational transceiver response, the channel would check to make sure that the received node descriptor indicated that the response came from transceiver number five on the other end of the link (i.e. transceiver number five is connected to transceiver number 5). If the transceiver numbers match in the first transceiver to receive an operational transceiver response, the channel places that transceiver in a transceiver-configured state. The node descriptor included in this first response is saved for comparison with later responses. With the receipt of every subsequent operational transceiver response or request, the subsequent node descriptors are compared to the node descriptor saved front the first transceiver which became configured. All subsequent transceivers must have the same node descriptor, with matching transceiver numbers, to enter the configured state. This checking ensures that all of the configured transceivers are actually connected to the same node descriptor (i.e. the same interface of the same computer element on the other side of the link). There is a time limit as to when a response from a transceiver must be received. This limit is implemented in order to prevent the system from hanging up while waiting for a transceiver which might never respond (e.g. a broken transceiver). There is also a retry operation in which the command to acquire the node descriptor is repeated a number of times if the previous command failed. There is a maximum number of retries which are attempted before the operation will fail. If the node descriptor comparison is successful and the transceiver-configured state is entered, the transceiver is marked as configured in a Configured-Transceiver table. If the transceiver returned an invalid node descriptor, or the limits for response time and retry have been exceeded, the transceiver is marked as being not configured in the Configured-Transceiver table. A sample Configured-Transceiver table is shown in FIG. 5.

The method for establishing the operational bus is primarily driven by state tables called Transceiver-State tables. Each channel of each element in the data processing complex contains a Transceiver-State table. This table actually contains two sub-tables, the Allowed-Operational-Link table and the Configured-Transceiver table. As described above, the Configured-transceiver table contains a entry for each of the transceivers attached to the channel. This entry will indicate whether or not the transceiver is in a configured state as can be seen in the sample Configured-Transceiver table of FIG. 5. If a particular transceiver was not operational in the sending channel, was considered off-line by the channel, the node descriptor did not match, or no operational transceiver response or request was received, the transceiver does not reach the configured state and is marked as not configured in the Configured-Transceiver table.

The next operation in the establishment of the operational link uses the Transceiver-State tables in order to determine which combination or set of transceivers is to be considered for the link. This operation results in an intermediate set of transceivers called an Intended-Operational-Link. The different combinations or sets of transceivers which could possibly become part of the Intended-Operational-Link are called Allowed-Operational-Links and reside in the Allowed-Operational-Link table, the second of the Transceiver-State tables. This table contains an ordered list of all of the allowed sets of transceivers which could possibly become an operational link for the channel. If a combination of transceivers is not in the Allowed-Operational-Link table, it can never become an operational link. It must be kept in mind that the Allowed-Operational-Link table does not indicate whether or not a transceiver or set of transceivers is actually operational, it only provides the various combinations of transceivers which could possibly form an operational link. A sample Allowed-Operational-Link table is depicted in FIG. 7 and will be discussed more fully later in this description. The Allowed-Operational-Link table is preferably built before the beginning of the link initialization, and would not be dynamically created such as the Configured-transceiver table. As an alternative to having an actual table in the memory of the channel, each of the Allowed-Operational-Links could be dynamically generated at the point in the process at which they are required. The generating mechanism would output the permissible permutations of combinations of transceivers, governed by the same rules which govern the generation of the Allowed-Operational-Link table.

The preferred ordering of the sets of Allowed-Operational-Links in the Allowed-Operational-Link table is shown in FIG. 6. In examining FIG. 6, it can be seen that Allowed-Operational-Links are divided into successively smaller and smaller sets of transceivers. The first entry in the table will be a link containing all of the transceivers attached to the channel. The full set of transceivers attached to a channel is then divided into halves, then into quarters, then into eighths and so on until the smallest set of transceivers which form an Allowed-Operational-Link contains only a single transceiver. For example, to define a quarter of the transceivers, the full set of transceivers is divided into quarters starting with the highest order transceiver (transceiver 1, 2, ... ) for ¼ of the transceivers in the link; then the second quarter of the transceivers starts, followed by the third and fourth quarters. This quartering divides an Allowed-Operational-Link into four sublinks that are each ¼ of the size of the original Allowed-Operational-Link and contain consecutively numbered transceivers in each link. Any given transceiver will only be contained in one of the quarter length sublinks. The process is the same for each of the sublinks; ½, ¼, ⅛, $\frac{1}{16}$, $\frac{1}{32}$ and $\frac{1}{64}$ sublink. Each sublink contains ½, ¼, ⅛, $\frac{1}{16}$, $\frac{1}{32}$ or $\frac{1}{64}$ of the total number of transceivers attached to the channel, starting from the highest order transceiver to the lowest and using consecutive transceiver numbering. It can be appreciated that the present invention is not limited by the 64 transceiver channel depicted in these examples. For example, if the channel happens to have 256 transceivers attached, then there will be granularity in the Allowed-Operational-Link table down to $\frac{1}{256}$ of the full set of transceivers.

FIG. 7 depicts a sample Allowed-Operational-Link table for a channel with a total of four transceivers attached to the channel. The sample table shown in FIG. 7 has been generated based on the methodology outlined in FIG. 6. The first entry in the sample table contains all four of the transceivers. The second entry in the table contains a set of transceivers including the first one half of the transceivers, namely the first and second transceivers. The third entry is the set containing the lower one half of the transceivers, the third and fourth. The fourth entry contains the first quarter of the transceivers, the first transceiver. The remainder of the table continues until the final allowed set of transceivers contains only the single transceiver, the fourth.

It can be seen from an examination of both FIGS. 6 and 7 that only certain combinations, or sets, of transceivers can be considered when forming an operational link. For example, transceivers one, two, three and five could never form an operational link because they are not combined together as an entry in the Allowed-Operational-Link table. Furthermore, any combination of transceivers whose total number is not a power of two is not allowed to form an operational link. The reason for the methodology of allowing certain combinations to form an operational link and disallowing other combinations is based on the capabilities designed into the channel. A person experienced in the art can see that any combination of transceivers is theoretically possible, but implementation considerations may make some of the combinations less desirable. For example if every single possible combination of transceivers were allowed, the channel would have to incorporate a full crosspoint switch which would have an effect on the performance of the system. The use of the Allowed-Operation Link table permits the designer to implement only a subset of all possible combinations of transceivers, which results in lower cost implementations.

Returning to the procedure for determining the Intended-Operational-Link, once the Configured-Transceiver table has been built, and all of the transceivers have completed their respective entries in the table, or a specific period of time has expired, the next step in the link initialization procedure is invoked if one or more transceivers is in a configured state. If no transceivers were able to be configured, or fewer then a minimum number, no operational link can be formed and link initialization fails. If there are a minimum number of configured transceivers, the Allowed-Operational-Links are systematically compared to the transceivers which have been configured, until a match is found or until a minimum number of transceivers cannot be found for the Intended-Operational-Link. This process begins by searching the Allowed-Operational-Link table for the different sets of transceivers which comprise Allowed-Operational-Links. The search will first result in the Allowed-Operational-Link which is the set containing the full complement transceivers. Once the search has acquired this set, the system then checks the Configured-Transceiver table to see if each of the transceivers in the set has been configured. If all of the transceivers in this first Allowed-Operational-Link are configured, the procedure will move on to the next step described below. If even one of the transceivers is not configured (as indicated in the Configured-Transceiver table), then the comparison will fail and the system will continue to search the Allowed-Operational- Link table for the next set of transceivers in an Allowed-Operational-Link. A second search of the Allowed-Operational-Link table will result in the set of transceivers in the high order one half of the transceivers (the second entry in the Allowed-Operational-Link table). The Configured-Transceiver table will then be consulted again to determine if each member of the second set of transceivers has been configured. The process of searching and comparing continues until a match is found, the Allowed-Operational-Link table is exhausted, or a minimum number of transceivers for the operational link is not satisfied. A match is found when every transceiver in an Allowed-Operational-Link is found to be configured in the Configured-transceiver table. Once a match is found, this set of transceivers becomes an Intended-Operational-Link. If the system cannot establish an Intended-Operational-Link, then link initialization will fail. As a reminder, each of these process steps can be performed independently and in parallel in each of the two channels on either side of the link. Therefore, at some point, there can be two Intended-Operational-Links defined, one in each channel on either side of the link.

As explained previously, as an alternative to the Allowed-Operational-Link table, the system can dynamically generate the Allowed-Operational-Links as required. The first Allowed-Operational-Link generated would be the full set of transceivers attached to the channel. If this set contained a transceiver which was found not to be configured (in the Configured-Transceiver table), then the system would dynamically generate the next Allowed-Operational-Link, the high order one half of the transceivers. The process would continue similarly to the one using the table, until either an Intended-Operational-Link is formed, or link initialization fails. The choice of whether to use a table or to dynamically generate the Allowed-Operational-Links, entirely depends upon the particular implementation. If there are only a small number of Allowed-Operational-Links, then it might be preferable to dynamically generate the small list. Alternatively, if memory space in the channel is not limited, then a large Allowed-Operational-Link table could reside in the memory hardware which might add additional speed to the process of establishing an Intended-Operational-Link.

Once the Intended-Operational-Link has been established, the system can proceed onto the next step in the process of determining the final operational link. This step involves ensuring that both sides of the link agree on which of the conductors between the two computer elements will form the operational link. Up to this point, each channel can independently determine its own Intended-Operational-Link, but there has been no verification that the two Intended-Operational-Links correspond. At this point in the procedure, there are three methods by which the system can ensure that both sides agree on the operational link. The first method involves initiation on both sides of the link in a peer-to-peer relationship, while the second and third methods employ control by one channel in a master/slave relationship. The first and second methods require the use of a command, called an establish-transceiver-group command (ETG command), which is sent on each transceiver in the Intended-Operational-Link. The third method requires the use of a command, called an establish-link command (EL command), which is sent on each transceiver in the transceiver-configured state.

In the first method of verifying the Intended-Operational-Link, each channel issues an ETG command on each transceiver in its respective Intended-Operational-Link. This command will include a designation of each of the fibers which is a member of the Intended-Operational-Link. As the channel on the other end of the link begins to receive the ETG commands on its transceivers, it will compare them to its own Intended-Operational-Link in order to verify that there is a correspondence. The receiving channel will test to see that each of its transceivers which received the ETG command are included in its own Intended-Operational-Link. If there is one-to one correspondence, then the channel which received the ETG commands will send back a response indicating this state, on each of the transceivers in the verified Intended-Operational-Link. This response is called an ETG response. Both ends of the link issue the ETG command on each transceiver in its Intended-Operational-Link, and the ETG response must be received back on the same set of transceivers. If a channel receives responses on all of the transceivers in it's Intended-Operational-Link, then the Intended-Operational-Link becomes the operational link. If the ETG commands are received on a set of transceivers which don't agree with the channel's own Intended-Operational-Link (too few or too many transceivers), then the channel will send back a failed-transceiver group response and the initiating channel will attempt to resend the ETG commands up to a maximum number of times. If the channel issues ETG commands the maximum number of times without responses or failed responses, then link initialization will fail. This first method of verifying the Intended-Operational-Link can be seen to be a peer-to-peer operation in that both channels on either side of the link issue commands and formulate responses. Neither of the channels is acting in a dominant role.

In the second method of verifying the Intended-Operational-Link, only one channel, a master, originates ETG commands on the transceivers in its Intended-Operational-Link. The channel on the other side of the link, the receiving or slave channel, does not originate any commands. The slave channel will observe which of its transceivers receive ETG commands in order to verify that they comprise a fully configured and Allowed-Operational-Link. In order to perform this verification, the receiving channel uses its Configured-Transceiver table and Allowed-Operational-Link table. If the Intended-Operational-Link is, for any reason, unacceptable to the slave channel, it issues a failed-transceiver-group response back to the master channel. As with the peer-to-peer method of verifying the Intended-Operational-Link, if the master receives a failed-transceiver-group response, it will attempt to send the ETG command up to a maximum number of times. If the master issues the ETG command the maximum number of times with no responses or failed responses, then link initialization will fail. If the set of transceivers which received an ETG command comprise a fully configured, allowed operational link, the receiving channel sends ETG responses indicating as such on all of the transceivers in the verified Intended-Operational-Link. The master channel examines the responses to ensure that responses were received on all of the transceivers of its Intended-Operational-Link, and no other transceivers. If for any reason the responses do not match its Intended-Operational-Link, the intended link does not become the operational link. If there is one-to-one correspondence between the Intended-Operational-Link and the transceivers which received ETG responses, then the Intended-Operational-Link becomes the actual operational link. In this second method, only one end of a link issues commands on the transceivers in its Intended-Operational-Link, and the responses must be received on the same set of transceivers. Regardless of which method (peer-to-peer or master/slave) is used to verify the Intended-Operational-Link, the result of this part of the process is that an operational link has been established.

In the third method of verifying the Intended-Operational-Link, only one channel, a master, originates EL request commands on all the transceivers in the transceiver-configured state. A field in the EL request command indicates if the transceiver is capable of being part of an operational link at the master end of the link. The channel on the other side of the link, the receiving or slave channel, does not originate any requests. The channel which receives this command, a slave, will examine the frames and determine the set of transceivers which can become an operational-link. A logical AND operation is performed on a transceiver basis for the state of the transceiver at the slave channel as determined by the transceiver-configured table entry and the capability of the transceiver to become a member of an intended-operational-link as indicated in the frame received by the slave on the respective transceiver. The result of this logical operation is performed for each of the transceivers and the results are used as the candidate transceivers in a search of the allowed-operational-link table and a response is sent from the slave to the master indicating the results on each transceiver in the transceiver-configured state. The response frames returned contain a bit that is unique on each transceiver frame that indicates that the transceiver is part of the intended-operational-link at the slave. If no Intended-Operational-Link is possible, it issues a EL response command with no intended-operational link Once the slave sends these response frames, the intended-operational link becomes the operational link at the slave. Once the master receives these responses, the intended-operational-link as defined by the received frames is checked against the allowed-operational-link table entries to ensure that the intended-operational-link is valid, and if it is valid, the intended-operational-link becomes the operational-link and use of the link can begin. The master must receive responses on all transceivers in the transceiver configured state before the intended-operational-link can be checked. As with the peer-to-peer method of verifying the Intended-Operational-Link, if the master receives an EL response command with no intended-operational-link specified, it will attempt to send the EL request command up to a maximum number of times. If the master issues the EL request command the maximum number of times with no responses or failed responses, then link initialization will fail. If responses are not received within a specified time limit, the requests are resent. The allowed-operational-link tables are the same at both ends of the link. In this third method, only one end of a link issues requests on the transceivers in the transceiver-configured state.

Regardless of which method is used to verify the Intended-Operational-Link, the result of this part of the process is that an operational link has been established.

For the first and second methods, before message operations using the operational link can begin, a command called a bundle request is issued. The purpose of this command is a final assurance that both channels on either side of the link are in agreement as to which fiber pairs form the operational link. This command will only be sent once a channel has received establish-transceiver-group responses on all of the members of its Intended-Operational-Link and the operational link has been determined. If the channel receiving a bundle request agrees on the operational link, it sends back a bundle response and operations can commence on the operational link. If, for some reason, the receiving channel does not agree on the operational link, it will not send back a bundle response and no operational link is established. The channel sending a bundle request will wait a threshold time period within which it is expecting a bundle response. If no response is received during this threshold, the channel will reissue the bundle request. The bundle request can be reissued up to a maximum number of times. The threshold time for a bundle response and the maximum number of reissuances of the request can be adjusted by the designer of the system to the requirements of particular application. For example, in the preferred embodiment of the present invention, the time threshold is set to one second for a bundle response and the bundle request can be reissued a maximum of four times.

It is possible that a bundle response or EL response will be issued by one channel and never received by the other channel. In this situation, the channel which issued the bundle response or EL response will believe that there is an operational link in place and the other channel does not (it is still waiting to receive the bundle response or EL response). If a channel which is expecting a bundle response or EL response receives another valid message on the link, it will assume that the bundle response or EL response with the accept field set on was sent by the other channel and will configure itself accordingly. This means that it will establish the operational link from the Intended-Operational-Link and full communication on the link can proceed as if the bundle response or EL response was never lost.

Figure 9:
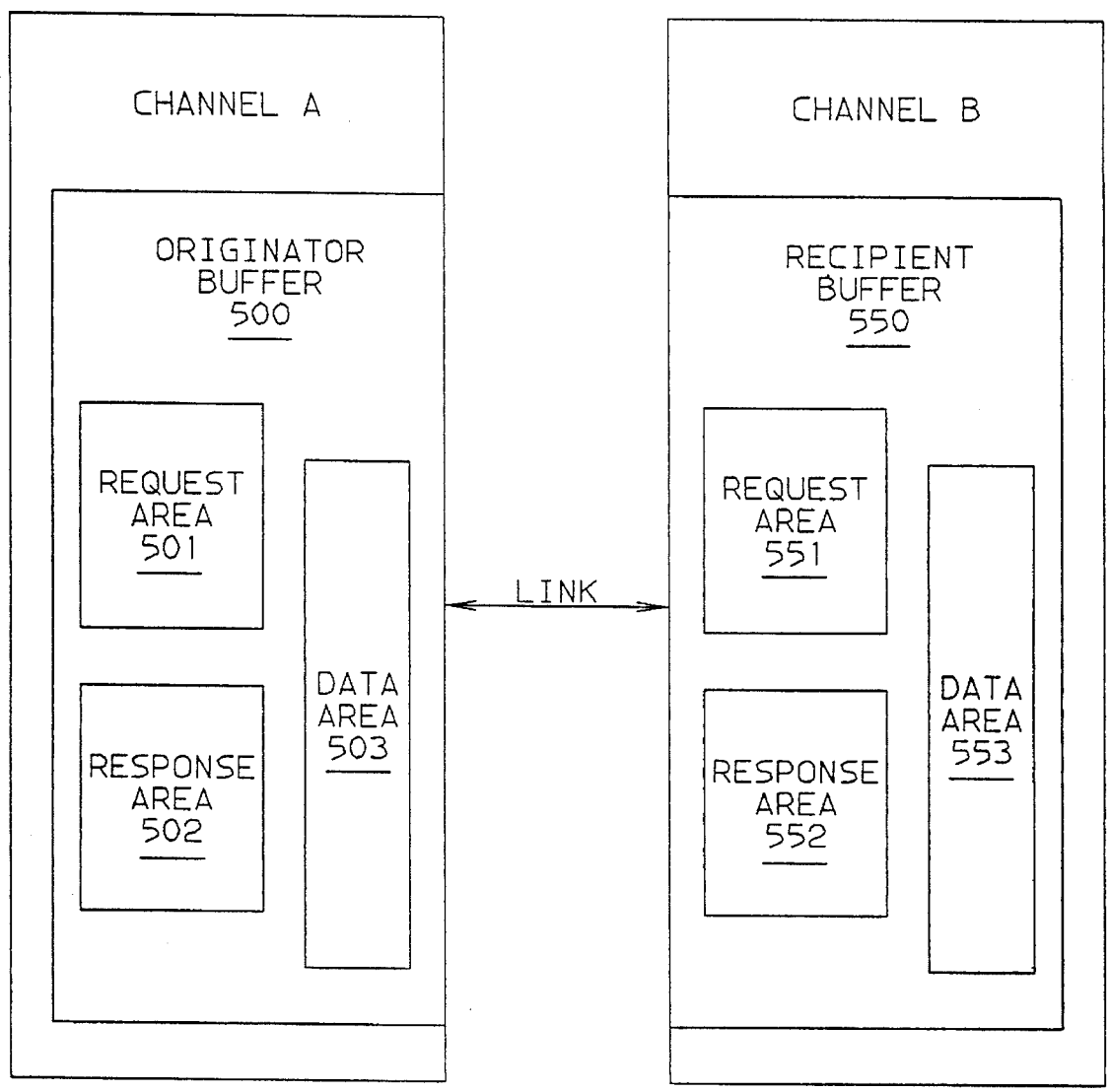
FIG. 9 illustrates the basic channel buffer structure.

After the operational link is fully established, the next and final operation in the initialization of the communication link between the two computer elements is to set up message buffers in the connected channels. The basic structure of the message buffers employed in the present invention is depicted in FIG. 9. A message buffer comprises two separate buffer structures which are required to support the transmission of a single message. These buffer structures are called the originator buffer, 500, and the recipient buffer, 550. A message buffer performs the task of buffering the information which is to be transmitted across the operational link. For example, if Channel A is initiating a message across the link, its originator buffer, 500, is used to hold the information before transmittal across the link. The originator buffer acts as a staging area for the message. As explained previously, information is transmitted across the link in a serial/parallel fashion over several conductors. The information is taken from the originator buffer, broken up into the pieces called frames, which are then transmitted in a serial manner on the parallel fibers. The recipient buffer, 550, in receiving Channel B, performs the converse function of reassembling the information comprising the message when the individual frames are received at the channel. The breaking up and reassembly of information for transmission is sometimes called interleaving. Although the buffer, 550, in Channel B is called a recipient buffer, it can, and does originate communications back to Channel A. For example, an ETG response from Channel B would be sent from its recipient buffer 550 to the originator buffer, 500, in Channel A. In this example, the originator buffer, 500, in Channel A would be the area in which the ETG response was reassembled after transmission across the link.

Both the originator and recipient buffers have three logical areas: a request area, 501 and 551; a response area, 502 and 552; and a data area, 503 and 553. The request information for a particular message is sent from the request area, 501 of the originator buffer, 500, to the request area, 551 of the recipient buffer 550. Similarly, any response information is sent from the response area, 552, of the recipient buffer, 550, to the response area, 502 of the originator buffer, 500. The data areas, 503 and 553, of each of the buffers are used for transmission and receipt of any additional data which is required for requests and responses.

Figure 10:
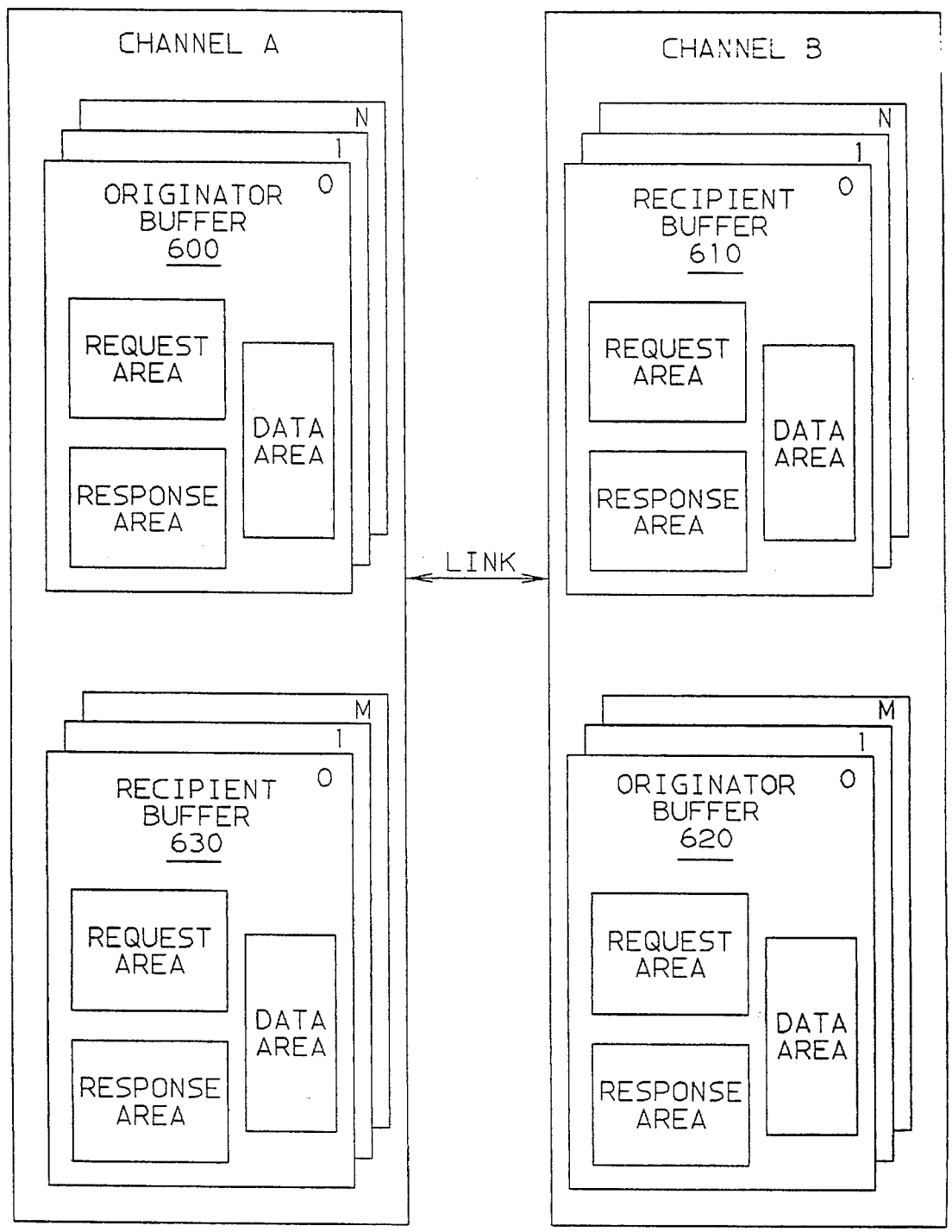
FIG. 10 illustrates a multimessage channel buffer structure.

A single paired set of originator and recipient buffers, called a message buffer, is required for the transmission of a single message. In the present invention, channels are capable of concurrent transmission of several messages. The buffer structure required for this type of communication is depicted in FIG. 10. It can be seen in the upper half of FIG. 10 that there are n+1 originator buffers in Channel A and a corresponding n+1 number of recipient buffers in Channel B. These n+1 paired buffer structures can support n+1 simultaneous message operations. For each originator buffer in Channel A, there exists a paired recipient buffer in Channel B. For example, originator buffer 600 in Channel A is paired with recipient buffer 610 in Channel B and this pair will support a single message operation. The originator buffer marked number 1 in Channel A is paired with the recipient buffer marked number 1 in Channel B. This second pair of buffers will support a second, concurrent message operation. The example in FIG. 10 depicts a system in which there are an equal number of recipient buffers and originator buffers, but there is no requirement that there be a originator buffer for every recipient buffer. The only requirement is that there is a recipient buffer for every originator buffer in the system. For example, Channel A in FIG. 10 might have only two originator buffers and Channel B could have 10 recipient buffers. In this example, the two originator buffers in Channel A would be paired with two of the recipient buffers in Channel B. The rest of the recipient buffers in Channel B would be unpaired and would not support message operations. In this example, the system would only be able to support two concurrent message operations from Channel A to Channel B.

It can be seen from further examination of the lower half of FIG. 10 that messages can be initiated from either channel. This portion of the Figure illustrates that channels are capable of containing both originator and recipient buffers. If Channel B was to initiate a message operation, it would use its originator buffer, 620, to send the message to Channel A's recipient buffer, 630. The number of recipient buffers in a channel does not have to equal the number of originator buffers in that same channel. In Channel B depicted in FIG. 10, there are n+1 recipient buffers, while there are m+1 originator buffers. M does not have to be equal to, greater than or less than n. The only requirement is that each originator buffer in a channel is paired with a recipient buffer in the channel on the other end of the link. In the example depicted in FIG. 10, there are n+1 recipient buffers in Channel B paired with n+1 originator buffers in Channel A. Similarly there are m+1 originator buffers in Channel B, paired with m+1 recipient buffers in Channel A.

The example depicted in the lower half FIG. 10 shows m+1 originator buffers paired with m+1 recipient buffers. As explained previously though, the only requirement is that there be one recipient buffer for each originator buffer. For example, Channel B might have four originator buffers and Channel A could have the capability to support seven recipient buffers. The four originator buffers in Channel B would be paired with four recipient buffers in Channel A and the remaining three recipient buffers in Channel A would not be utilized. The type, number, and size of the buffers on either end of the link is limited by the memory available to the channel and the capabilities built into the particular channel. Therefore, the n+1 number of originator buffers in Channel A, and the m+1 number of originator buffers in Channel B is the maximum number of originator buffers which could be established for the system depicted in FIG. 10. There does not have to be a one to one correspondence between the number of originator and recipient buffers, but there has to be one recipient buffer for every originator buffer in order to establish a message buffer.

Because of the requirement that each originator buffer must be paired with a corresponding recipient buffer on the other side of the link, both channels must agree and participate in the establishment of the type, number and size of the buffers which are to be used for message operations. In order to establish the type, number and size of the buffers which are to be used, special commands and responses called buffer commands and responses are exchanged between interconnected channels. Each channel will inform its counterpart channel on the other end of the link, of its capacity for recipient buffers using a set-buffer-size request. For the example depicted in FIG. 10, Channel B would inform Channel A that it is capable of providing n+1 recipient buffers of a specified size (size of request and data areas) to support message operations. Channel A, upon receipt of the set-buffer-size request evaluates whether or not the n+1 recipient buffers of the specified size are sufficient to support message operations. If the recipient buffers are insufficient to support message operations, Channel A will not establish any originator buffers, and message operations will not commence. If the n+1 recipient buffers are satisfactory to Channel A, it will establish the number of originator buffers which it requires for message operations. As stated previously, the number of originator buffers which Channel A establishes does not have to equal the number of recipient buffers capable of being provided by Channel B. For example, if Channel B indicated in its set-buffer-size request that it was able to provide 10 recipient buffers, but Channel A only required 2 originator buffers for message operations, then Channel A would only establish 2 originator buffers and only two message buffers would be established.

For each message buffer that exists (i.e., originator/recipient buffer pair), one message operation can take place. Thus, the multiple message buffer structure illustrated in FIG. 10 allows multiple messages to be in execution concurrently. Furthermore, these message operations can occur simultaneously in both directions on the link. Messages can originate from either Channel A or Channel B.

A channel issuing a set-buffer-sizes request will wait a threshold period of time during which it will expect a response. If no response is received within this threshold, the assumption is that the request was somehow lost on the link, the request times out and another set-buffer-sizes request is sent. The set-buffer-sizes request can be resent up to a maximum number of times. The same request is sent every time (i.e. the number and size of the buffers contained in the request does not change). If the maximum number of retries is reached, then link initialization will fail.

If the channel which receives a set-buffer-sizes request concurs in the number and sizes of the buffers (they meet or exceed the requirements for message operations), then it sends back a set-buffer-sizes response. Both channels will initiate set-buffer-sizes requests and will respond with set-buffer-sizes responses. If a channel does not have the capability of supporting recipient buffers, it still initiates a set-buffer-sizes request, but the number of buffers included in the request will be zero. Once each channel has initiated both request and responses, the link is fully established and operational, and true message operations can commence.

A second method for establishing the buffer sizes and number uses a single request/response exchange in a master/slave relationship. The master end of the link sends a set-buffer-sizes request with the number and sizes of the recipient buffers at the master end of the link. When the slave end of the link receives the set-buffer-sizes request from the master end of the link it verifies that the required number and sizes of recipient message buffers exist at the master end of the link and sends a set-buffer-sizes response that indicates the slave's recipient message buffer number and sizes, and a field that indicates the slave end's acceptance (or rejection) of the master's recipient message buffers. If the master receives a set-buffer-sizes response that indicates the slave's acceptance of the message buffers and the slave's recipient message buffer number and sizes are acceptable to the master, then a bundle request is sent and the description for the bundle request is used. Once the bundle request/response exchange is complete, message exchanges can begin. If the master receives a set-buffer-sizes response indicating the slave's non-acceptance or the slave's message buffer number or sizes are not acceptable to the master, then the link-initialization procedure fails.

A master channel issuing a set-buffer-sizes request will wait a threshold period of time during which it will expect a response. If no response is received within this threshold, the assumption is that the request was somehow lost on the link, the request times out and another set-buffer-sizes request is sent. The set-buffer-sizes request can be resent up to a maximum number of times. The same request is sent every time (i.e. the number and size of the buffers contained in the request does not change). If the maximum number of retries is reached, then link initialization will fail.

The above methods of establishing an operational parallel link was primarily directed at initially establishing an operational bus when the system of computer elements or a new link is first configured. One of the strengths of this method, though, arises when one of the conductors of the parallel bus becomes disabled or otherwise must be taken offline, and the bus must be reconfigured. In prior communication systems, the loss of one of the conductors of a parallel bus usually meant that all intersystem communication would cease until the conductor was either fixed or replaced. With the present invention, a link recovery procedure is employed to reconfigure the link, excluding the malfunctioning conductor, and communication using the remaining functional conductors can resume. Operations will proceed with a degraded performance, but it is not necessary to halt communications entirely.

When one or more of the transceivers in the operational link enters a failed state or must otherwise be taken offline (e.g. for maintenance), the link recovery procedure is invoked. A transceiver will enter a failed state for several reasons including: removal of a conductor; failure of a transmitter or receiver; discontinuity in the conductor; loss of power; improper cable length causing signal degradation; or excessive splices in the cable causing signal degradation.

There are two methods of recovering an operational link. The more drastic and disruptive method is to begin the link initialization procedure described above. This method involves going through each of the method steps which have been fully described above, including: synchronization; node descriptor exchange; building of a Configured-Transceiver table; establishment of an Intended-Operational-Link and so on. The less disruptive method is called a link-recovery procedure and only involves a subset of the steps of the full link initialization procedure.

When the system enters the link-recovery procedure, the Configured-Transceiver table is updated in order to indicate the transceiver or transceivers which are now unavailable for use by the system. The system will then go onto establishing a new Intended-Operational-Link. The establishment of this new Intended-Operational-Link differs from the link initialization procedure in one significant area. Instead of searching the Allowed-Operational-Link table from the beginning, the system starts the search from the point where the last search ended. This is to say, the system knows that the new Intended-Operational-Link can only be a subset of the last operational link (i.e. it has to have fewer transceivers because at least one of the transceivers in the last operational link has failed). The last operational link was established from the last Intended-Operational-Link, therefore the search for the new Intended-Operational-Link can start in the Allowed-Operational-Link table from the point where the last Intended-Operational-Link was found. If the Allowed-Operational-Links are being generated by a software program, then the software program can be designed to begin generating Allowed-Operational-Links that are a subset of the last operational link (i.e. the last Allowed-Operational-Link which the software program generated).

Once a new Allowed-Operational-Link is either found or generated, the link-recovery procedure establishes the Intended-Operational-Link in the same manner as the link initialization procedure, It begins by testing the set of transceivers against the Configured-Transceiver table, determining if the set forms a fully configured operational link. The search and test steps are continued until a match is found. Once the match is found, that set of transceivers becomes the new Intended-Operational-Link. As in the link initialization procedure, the link-recovery procedure sends out a Establish-Transceiver-Group, ETG, or establish-link, EL, command on each transceiver in the new Intended-Operational-Link. The message exchange involved in the ETG or EL process for link recovery is the same as the ETG or EL process for link initialization, namely: the Intended-Operational-Link is verified in either the master/slave or peer-to-peer method; ETG or EL responses are received on each transceiver in the Intended-Operational-Link; the operational link is established; and the bundle request is optionally issued. The link-recovery procedure differs from the link initialization procedure at this point, in that no set-buffer-sizes commands need to be issued in link recovery. The buffer structures which were established during initialization are not disturbed during recovery. The system will utilize the same buffers, with a reduced number of transceivers in the link. While the system is in the process of link-recovery, all requests for message transmissions are presented with link busy indications. Message operations will not continue until the new operational link has been established.

FIG. 8a depicts a system according to the present invention in which all four fiber-pairs of a four fiber-pair link are operational. The message areas, 200 and 210, correspond to the message buffers described in relation to FIG. 9 and 10. These areas serve as buffers for incoming or outgoing messages. The interleave logic, 220 and 230, is the mechanism by which the information constituting messages is either broken up into frames for transmission or reassembled back into the original message after reception. In the case of interleave logic 220, the logic divides any message into four frames of equal size before transmission. This is the meaning of the symbol 1:4 in the interleave logic box, 220. The interleave logic, 220, in FIG. 8a divides the information into four equal frames because the operational link in this particular example is made up of four fiber-pairs. During transmission of the message, each of the fiber-pairs will carry one of the frames of information in parallel with the other three fibers-pairs. Symmetrically, the interleave logic, 230, on the other side of the link reassembles the data back into the original message at a 4:1 ratio. The interleave logic, 230, receives four separate frames of information and proceeds to interleave the four frames back into the original message.

FIG. 8b(1) illustrates the four fiber-pair system of FIG. 8a in which either fiber-pair 3 or fiber-pair 4 are inoperative. Recall that the terms fiber-pair and transceiver can be used interchangeably when discussing the conductors in a link. This figure depicts a system which has just been initialized and the fiber-pair was initially inoperative or, alternatively, this figure depicts a system in which a fiber-pair became inoperative during message operations and the system has gone through the recovery procedure described earlier. In either case, the operational link in FIG. 8b(1) consists of only fiber-pairs 1 and 2. In this system, it does not matter if fiber-pair 3, fiber-pair 4 or both fiber-pairs are inoperative. If either one, or both are inoperative, then neither of the fiber-pairs can take part in an operational link. At this point it will be useful to explain this example by illustrating the method of determining an Intended-Operational-Link as has been described earlier.

The first step after synchronization has occurred is to build the Configured-Transceiver table. In this example, the entry for either fiber-pair 3 or 4 or both fiber-pairs, indicates that the fiber-pair(s) is NOT CONFIGURED (see FIG. 5). This entry can occur, for example, because the system was not able to achieve synchronization on the fiber-pair(s), an invalid node descriptor was returned on the fiber-pair(s) or no operational transceiver response was ever received after successive operational transceiver requests. After the Configured-Transceiver table has been built, the next operation is to search the Allowed-Operational-Link table for a link which is allowed to become and operational link. The Allowed-Operational-Link tables for this particular example will be the same as the one depicted in FIG. 7. (Remember, there are two Allowed-Operational-Link tables in the system, one in each channel attached to the particular link.) The first Allowed-Operational-Link in the table will be a set of transceivers containing all of the fiber-pairs, 1, 2, 3 and 4. The system will compare the fiber-pairs in this set to the status of each transceiver in the Configured-Transceiver table. During this comparison, it is found that this link is unacceptable since fiber-pair 3 or 4 or both fibers are NOT CONFIGURED and therefore cannot become part of an operational link. The second search of the Allowed-Operational-Link table will result in a set of transceivers including fiber-pairs 1 and 2. The testing of these these transceivers against the Configured-Transceiver table, reveals that this is an acceptable link and fiber pairs 1 and 2 become the Intended-Operational-Link. The remainder of the procedure continues until fiber-pairs 1 and 2 are finally configured as the operational link. The important thing to identify at this point, though, is that it did not matter whether it was fiber-pair 3, 4 or both which were inoperative, the process of the preferred embodiment of the present invention of searching the Allowed-Operational-Link table and testing the Configured-Transceiver table would have driven both fiber-pairs 3 and 4 out of the operational link.

Turning to FIG. 8b(2), this figure depicts a system in which fiber-pairs 3 and 4 form the operational link. As with the previous example, it does not matter if fiber-pair 1, 2 or both were inoperative, the method of the preferred embodiment of the present invention will establish an operational link out of fiber-pairs 3 and 4. At the point in link initialization, where the Allowed-Operational-Link table is being searched, the first set of transceivers found, which includes all of the transceivers, is unacceptable since either fiber-pair 1, 2 or both are NOT CONFIGURED in the Configured-Transceiver table. The second set of transceivers is similarly unacceptable since it contains only fiber-pairs 1 and 2. The third Allowed-Operational-Link is acceptable since it contains only CONFIGURED transceivers, namely fiber-pairs 3 and 4. Recall, as an alternative to the Allowed-Operational-Link table, the Allowed-Operational-Links can be generated by a software program. Using either the table or the software program will result in the same operational link, because both are constrained by the rules illustrated in FIG. 6. In both FIGS. 8a(1–2), the interleave logic, 220 and 230, is described as being 1:2 (or respectively 2:1). The reason for this is that since there are only two active conductors in the operational link, the information which is to be transmitted across the link has to be partitioned into two separate frames of data (as opposed to four frames in the prior example in FIG. 8a).

FIGS. 8c(1–4) depict systems in which there is only one active fiber-pair in the operational link. Looking at the Allowed-Operational-Link table in FIG. 7, it can be seen that each individual fiber-pair can form an operational link by itself. A system using only one conductor as the link between computer elements will result in the lowest bandwidth of any link, but the two computer elements will still be able to communicate on the one conductor. In these systems there is essentially no interleaving since the data is to be transmitted in a strictly serial fashion over the single conductor (hence the interleave ratio of 1:1).

In order to illustrate the recovery procedure described above, let us suppose that the current operational link is the one depicted in FIG. 8b(2), with both fiber-pairs 1 and 2 being inoperable. If fiber-pair 3 is somehow broken, the system will enter the recover procedure. The first step in the recovery procedure is to mark fiber-pair 3 as NOT CONFIGURED in the Configured-Transceiver table. The next step will be to search the Allowed-Operational-Link table for a new acceptable link. The last acceptable Allowed-Operational-Link included fiber-pairs 3 and 4. The search of the table during the recovery procedure will begin at the next entry below this point since all of the above sets of links are known to contain NOT CONFIGURED transceivers (see FIGS. 5 and 7). The next three entries in the table yields sets of transceivers including fiber-pairs 1, 2 and 3 all by themselves. All three of these sets will be rejected during the testing operation since all three are NOT CONFIGURED. The final Allowed-Operational-Link is fiber-pair four all by itself. It constitutes an acceptable link because it is to be CONFIGURED in the Configured-Transceiver table. The remainder of the process continues as described above. e.g. using the ETG requests and responses, using the bundle requests and responses but not using the set-buffer-sizes (because the buffers remain the same regardless of how many conductors are in the operational link). The final result of the link-recovery procedure is the system depicted in FIG. 8c(4) with the operational link being made up of only a single fiber-pair, fiber-pair 4.

There are two methods of quiescing the operational link. The quiesce of the link causes the messages at each end of the link to complete, and no new messages to start. Once the link is quiesced, the operational link may be redefined without errors occurring in messages. The quiesce can be used to add or delete transceivers from an operational link in a planned manner, so as maintenance actions. The quiesce can also be used so that the message processor code can be changed at either end.

The first method of quiescing is shown in FIG. 11. When one end of the link requires that the link be quiesced, it sends a quiesce request (1100) and becomes the quiesce originator. The other end of the link when it receives the quiesce request becomes the quiesce recipient. The quiesce recipient may have message requests outstanding (1101) when it receives the quiesce request (1100). The quiesce recipient will continue to receive message requests (1102 and 1106) and respond to them with message responses (1103 and 1107). The quiesce recipient will not initiate any new message requests, but will wait for all outstanding message responses (1104) or recovery actions that may take place for these responses to complete before sending a quiesce response (1105). Once the quiesce response has been sent, no new message requests are sent by the quiesce recipient, but the quiesce recipient will continue to respond to message requests originated by the quiesce originator (1104) with message responses (1107) or recovery actions for quiesce originator message requests. Once the quiesce originator has received the quiesce response (1105) and all outstanding message requests for the quiesce originator have completed (1107), the link is quiesced (1108). The quiesce originator must stop sending message requests for the link to be quiesced. The quiesce originator can stop issuing new requests before the quiesce response is received, or alternatively after the quiesce response is received. In the event that both ends of the link send quiesce requests at the same time, the end of the link that has the higher node descriptor becomes the quiesce originator, and the end of the link that has the lower node descriptor becomes the quiesce recipient.

The second method of quiescing is shown in FIG. 12. When one end of the link requires that the link be quiesced, it waits for all of its outstanding message requests (1200) to be responded to (1203) or recovered. Once an end of the link requires that the link be quiesced, it does not issue any new message requests. Once all outstanding message requests are completed, a quiesce request is sent by the quiesce originator (1202). The other end of the link when it receives the quiesce request becomes the quiesce recipient. The quiesce recipient may have message requests outstanding (1201) when it receives the quiesce request (1202). The quiesce recipient will not receive further message requests from the quiesce originator. The quiesce recipient will not initiate any new message requests, but will wait for all outstanding message responses (1204) or recovery actions that may take place for these responses to complete before sending a quiesce response (1205). Once the quiesce response has been sent, no new message requests are sent by the quiesce recipient. Once the quiesce originator has received the quiesce response (1205) the link is quiesced (1206). In the event that both ends of the link send quiesce requests at the same time, the end of the link that has the higher node descriptor becomes the quiesce originator, and the end of the link that has the lower node descriptor becomes the quiesce recipient.

Once the link is quiesced, transceivers can change their state, node descriptors exchanged, and the link-recovery procedure described above can be initiated by the quiesce originator. The link-recovery procedure described above is modified to look at all the transceivers in the transceiver-configured state, rather than just a subset of the previous operational link. This allows transceivers to be added to the operational link. In this manner, transceivers can be added to an operational link or taken away from an operational link without message errors occurring due to the link-recovery procedure being invoked.

Figure 13:
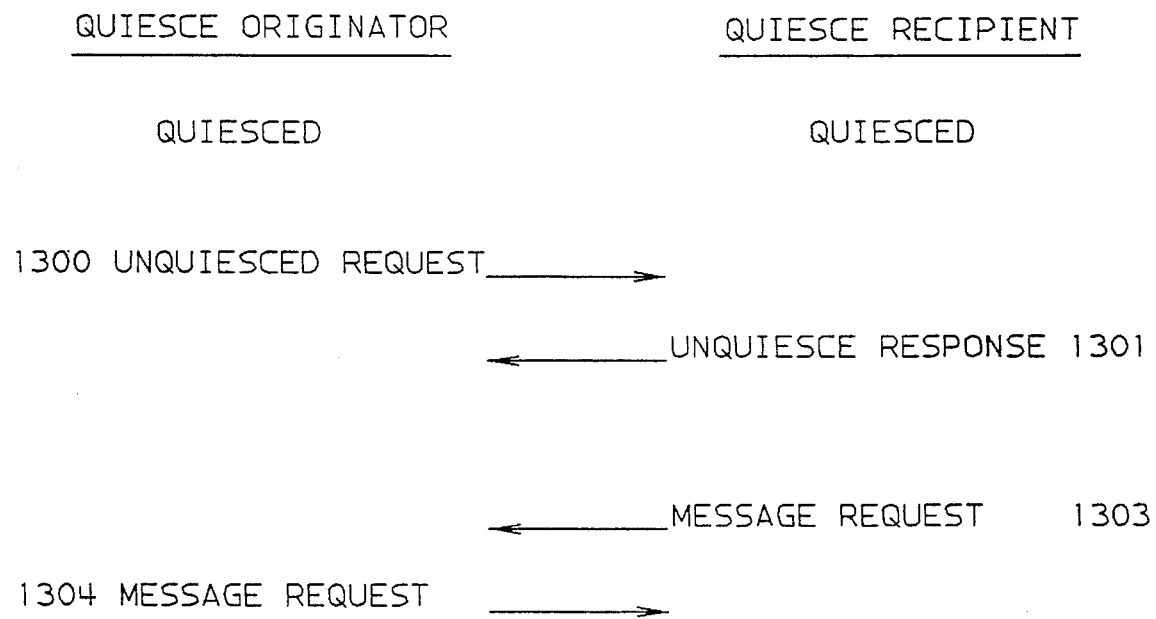
FIG. 13 illustrates the unquiesce methodology.

Once the link is quiesced, maintenance actions such as code changes to the originator end of the link can occur without message errors occurring due to the code being partially loaded when a message arrived. FIG. 13 shows the unquiesce procedure for restarting the messages on the operational link. Once the maintenance action has completed, the quiesce originator sends an unquiesce request (1300), the unquiesce recipient when it receives the unquiesce request (1301) sends an unquiesce response (1303) and may start sending messages (1304). The quiesce originator after it has sent the unquiesce request (1300) and receives a message request, executes the message request as if the unquiesce response had been received, and starts message operations (1304) at the quiesce originator. This allows for the loss of the unquiesce response (1303) on the link.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method of reconfiguring an operational link between a first element interconnected with a second element of a data processing complex, each of said elements containing at least one channel for interfacing with other elements, said method comprising:

initiating from a quiesce operator, which has become a master after a quiesce, a desired reconfiguration sequence, which reconfiguration sequence includes the steps of:

determining operational connectivity between a channel of said first element and a channel of said second element for every conductor interconnecting said elements;

acquiring a node descriptor on each operational conductor connected to said, said node descriptors uniquely describing a channel to which said conductor is connected;

sending an operational-transceiver request on an operational conductor connected to an originator channel, said request containing a node descriptor which uniquely describes said originator channel and said originator transceiver;

receiving said operational-transceiver request on a receiving set of transceivers in a recipient channel; and responding to said operational-transceiver request on each of said transceivers in said receiving set with an operational-transceiver response, said response containing a node descriptor which uniquely describes said recipient channel and said receiving transceiver;

marking as configured in a configured-conductor table, each conductor connected to each of said channels if said acquired node descriptor matches a node descriptor uniquely describing said interconnected channel;

generating an intended-operational-link, said intended-operational-link being one of a plurality of allowed-operational-links, said allowed-operational-links being sets of conductors which are allowed to form an operational link;

comparing each conductor in said intended-operational-link to said configured-conductor table;

repeating said generation and comparison steps if one of said conductors in said intended-operational-link is not marked as configured in said configured-conductor table;

verifying said intended-operational-link if each of said conductors in said intended-operational-link is marked as configured in said configured-conductor table, said verification ensuring that said intended-operational-link can form an operational link between said channels; and establishing said operational link from said intended-operational-link if said intended-operational-link is verified.

2. A method according to claim 1 further comprising the steps of:

repeating said sending step if said operational-transceiver response is not received by said originator channel within a threshold period of time: and performing said repeating step up to a maximum number of times.

3. A method of reconfiguring an operational link between two interconnected elements of a data processing complex according to claim 1 wherein:

the acquisition of node descriptors occurs prior to the quiescence of an operational link.

4. A method of reconfiguring an operational link between two interconnected elements of a data processing complex according to claim 1 wherein:

the acquisition of node descriptors occurs after the quiescence of an operational link.

5. A method of suspending operations indefinitely across an operational link where either end may initiate quiesce requests, comprising the steps of:

suspending new message requests by a quiesce originator before a quiesce response is sent;

sending a quiesce request from the quiesce originator;

determining that a quiesce is requested by the receipt of a quiesce request at a quiesce recipient;

suspending of new messages by the quiesce recipient;

completing all message requests received by thee quiesce recipient;

sending a quiesce response by the quiesce recipient once all messages originated by the quiesce recipient have completed: and quiescing the quiesce originator once the quiesce response has been received.

6. A method of adding and/or deleting transceivers to/from an operational link comprised of a first set of conductors, without errors to messages carried on the operational link between elements of a data processing complex having a configured-conductor table indicating whether each conductor is configured, comprising the steps of:

quiescing the operational link;

re-establishing a previously operating link comprised of a second set of conductors between two elements of a data processing complex by:

marking said first set of conductors as being not configured in said configured-conductor table and marking said second set of conductors as being configured in said configured-conductor table; and generating an intended-operational-link, said intended-operational-link being a third set of conductors which are allowed to form an operational link; and comparing said third set of conductors to said configured-conductor table;

repeating said generation and said comparison if said intended-operational-link contains any conductor which is not marked as configured in said configured-conductor table; and establishing said operational link from said intended-operational-link if all of said conductors in said intended-operational-link are marked as configured in said configured-conductor table.

7. In a data processing complex with interconnected elements in which elements of the complex are operationally connected, a method useful in configuring operational links between elements which can be quiesce originators and quiesce recipients, comprising the steps of:

suspending operations across an operational link in response to initiating from either end of an operating link a quiesce request from a quiesce originator;

determining at a quiesce recipient that a quiesce is requested by receipt of a quiesce request:

suspending any new messages by the quiesce recipient:

completing all message requests received by the quiesce recipient:

sending a quiesce response by the quiesce recipient once all messages originated by the quiesce recipient have completed:

suspending any new message requests by the quiesce originator once the quiesce response has been received; and quiescing the quiesce originator once the quiesce response has been received and all outstanding quiesce originator messages have completed.

8. A method according to claim 7 wherein:

the suspending of new message requests by the quiesce originator occurs after the quiesce request is sent and prior to the quiesce response being received.

9. A method according to claim 7 wherein:

the suspending of new message requests by the quiesce originator occurs before the quiesce request is sent.

10. A method according to claim 7 wherein after a quiesce owner has been identified, existing operational connectivity between nodes of the communication complex can be changed, by determining operational connectivity between a first and second element of said complex for those conductors interconnecting said elements;

marking as configured in a configured-conductor table all of said conductors which have been determined to operationally connect said two elements;

generating an intended-operational-link in both elements, where one element, the quiesce originator, is denoted as a master, the other element being denoted as a slave, said intended-operational-link being a set of conductors which are allowed to form an operational link;

comparing said intended-operational-link to said configured-conductor table;

repeating said generation and said comparison if said intended-operational-link contains any conductor which is not marked as configured in said configured-conductor table; and establishing said operational link from said intended-operational-link if all of said conductors in said intended-operational-link are marked as configured in said configured-conductor table.

11. A method according to claim 10 further comprising:

originating a command from said master on each conductor in the transceiver-configured state prior to establishing said operational link;

receiving said command on a receiving set of conductors at said slave;

verifying said receiving set of conductors is capable of forming an operational link in said slave; and transmitting a positive response with the intended-operational-link to said master if said receiving set of transceivers is capable of forming matches an operational link.

12. A method according to claim 11 further comprising:

transmitting a negative response to said master if said receiving set of transceivers is incapable of forming an intended-operational link; and repeating said originating, receiving and verifying steps up to a maximum number of times.

* * * * *